US012062848B2

(12) United States Patent
Suzuki et al.

(10) Patent No.: US 12,062,848 B2
(45) Date of Patent: Aug. 13, 2024

(54) ANTENNA APPARATUS

(71) Applicant: Sony Group Corporation, Tokyo (JP)

(72) Inventors: Yuichiro Suzuki, Tokyo (JP); Takayoshi Ito, Tokyo (JP); Tomihiro Omuro, Tokyo (JP); Toru Ozone, Tokyo (JP); Jin Sato, Tokyo (JP); Yoshiaki Hiraoka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 580 days.

(21) Appl. No.: 17/288,922

(22) PCT Filed: Nov. 9, 2018

(86) PCT No.: PCT/JP2018/041653
§ 371 (c)(1),
(2) Date: Apr. 27, 2021

(87) PCT Pub. No.: WO2020/095436
PCT Pub. Date: May 14, 2020

(65) Prior Publication Data
US 2021/0399428 A1 Dec. 23, 2021

(51) Int. Cl.
*H01Q 13/10* (2006.01)
*H01Q 21/24* (2006.01)

(52) U.S. Cl.
CPC ............. *H01Q 13/10* (2013.01); *H01Q 21/24* (2013.01)

(58) Field of Classification Search
CPC ........ H01Q 13/10; H01Q 21/24; H01Q 1/243; H01Q 1/44; H01Q 13/106
See application file for complete search history.

(56) References Cited

U.S. PATENT DOCUMENTS 5,489,913 A 2/1996 Raguenet
6,778,144 B2 8/2004 Anderson
(Continued)

FOREIGN PATENT DOCUMENTS

CN 203983481 U 12/2014
CN 106654562 A 5/2017
(Continued)

OTHER PUBLICATIONS

International Search Report and Written Opinion mailed on Jan. 15, 2019, received for PCT Application PCT/JP2018/041653, Filed on Nov. 9, 2018, 7 pages including English Translation.
(Continued)

*Primary Examiner* — Dieu Hien T Duong
(74) *Attorney, Agent, or Firm* — XSENSUS LLP

(57) ABSTRACT

To provide a technology that can suppress the reduction of an antenna gain while maintaining the quality of the design of the exterior furnishing of the antenna.

Provided is an antenna apparatus including: an antenna module that includes a first slot antenna that transmits or receives a first wireless signal, a first feed element that supplies power to the first slot antenna, a second slot antenna that transmits or receives a second wireless signal having a polarization direction orthogonal to a polarization direction of the first wireless signal, and a second feed element that supplies power to the second slot antenna; and a metal plate that includes a first slot, and a second slot a longitudinal direction of which is orthogonal to a longitudinal direction of the first slot.

15 Claims, 45 Drawing Sheets

(56) References Cited

U.S. PATENT DOCUMENTS

| | | | | |
|---|---|---|---|---|
| 2009/0231215 | A1 | 9/2009 | Taura | |
| 2011/0050534 | A1 | 3/2011 | Shimayama | |
| 2011/0181482 | A1 | 7/2011 | Adams | |
| 2013/0141296 | A1 | 6/2013 | Jaffri | |
| 2017/0110787 | A1 * | 4/2017 | Ouyang | H01Q 1/42 |

FOREIGN PATENT DOCUMENTS

| | | | |
|---|---|---|---|
| CN | 108550981 | A | 9/2018 |
| JP | S63-211804 | A | 9/1988 |
| JP | 5-145317 | A | 6/1993 |
| JP | 5-199031 | A | 8/1993 |
| JP | 2005-72653 | A | 3/2005 |
| JP | 2008-78720 | A | 4/2008 |
| JP | 2014-127751 | A | 7/2014 |
| WO | 00/48269 | A1 | 8/2000 |
| WO | WO-2004075434 | A1 | 9/2004 |

OTHER PUBLICATIONS

Eletromagnetic Shielding Optimization Research of ECE Imaging Diagnostic on EAST, LiTong, Sep. 15, 2015.

IEEE Transactions on Antennas and Propagation Aug. 8, 2005 D.M. Nashaat; H.A. Elsadek; H. GhaliSingle feed compact quad-band PIFA antenna for wireless communication applicationsSingle feed compact quad-band PIFA antenna for wireless communication applications.

* cited by examiner

FIG.1

| | RESIN MODEL | METAL MODEL | PARTIALLY REMOVED METAL |
|---|---|---|---|
| DIA-GRAM | 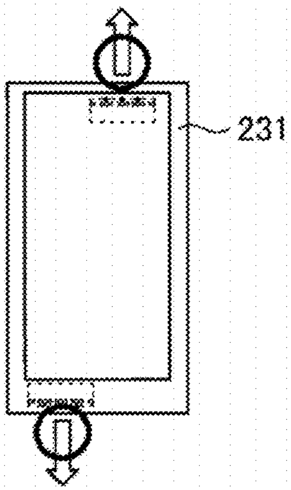 | 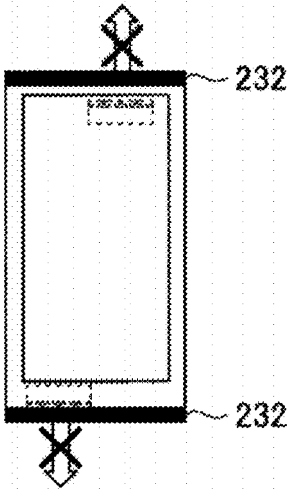 | 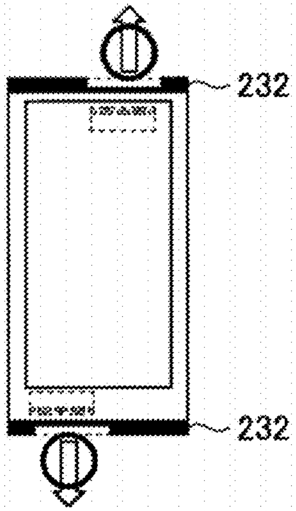 |
| Pros. | THERE IS NOT VERY MUCH DEGRADATION IN EMISSION CHARACTERISTICS | METAL DESIGN CAN BE MAINTAINED | THERE IS NOT VERY MUCH DEGRADATION IN EMISSION CHARACTERISTICS |
| Cons. | ONLY RESIN DESIGN IS POSSIBLE | BECAUSE THERE IS SOME METAL IN DIRECTIONS IN WHICH ELECTRIC WAVES ARE EMITTED, ELECTRIC WAVES ARE REFLECTED BY METAL. THEREFORE, ELECTRIC WAVES ARE NOT EMITTED OUTSIDE OF HOUSING | DESIGN QUALITY DETERIORATES BECAUSE METAL IS CUT OUT |

ANTENNA APPARATUS

CROSS-REFERENCE TO RELATED APPLICATION

The present application is based on PCT filing PCT/JP2018/041653, filed Nov. 9, 2018, the entire contents of which are incorporated herein by reference.

FIELD

The present disclosure relates to an antenna apparatus.

BACKGROUND

In mobile communication systems that are based on a communication standard referred to as LTE/LTE Advanced (LTE-A), wireless signals at a frequency referred to as an ultrahigh frequency near 700 MHz to 3.5 GHz are used in the communication.

Furthermore, in communications using an ultrahigh frequency, such as that according to the communication standard mentioned above, by using a technology what is called multiple-input and multiple-output (MIMO), it becomes possible to use reflected waves as well as direct waves in transmitting and receiving the signals even in a fading environment, so that the communication performance can be further improved. According to the MIMO, because a plurality of antennas will be used, various discussions have been made on technologies for enabling better configurations for installing a plurality of antennas in a terminal device such as a smartphone for mobile communications.

Furthermore, various discussions have recently been made on the fifth generation (5G) mobile communication systems, which follow the LTE/LTE-A. For example, some discussions have been made on the use of wireless signals referred to as millimeter waves, such as those at frequency of 28 GHz or 39 GHz (hereinafter, simply referred to as "millimeter waves"), for such mobile communication systems.

While millimeter waves are capable of increasing the amount of transmitted information compared with the ultrahigh-frequency waves, millimeter waves travel with higher straightness, and millimeter waves tend to experience a greater propagation loss and reflection loss. Therefore, the direct waves rather than the reflected waves contribute more to the communication characteristics in the wireless communications using the millimeter waves. Due to these characteristics, an introduction of a technology referred to as polarized MIMO, which implements the MIMO using a plurality of polarizations in directions different from each other (for example, a horizontal polarization and a vertical polarization), has been discussed for the 5G mobile communication systems.

Generally speaking, because millimeter waves experiences relatively high spatial attenuations, there are often demands for high-gain antennas in a configuration using millimeter waves in the communication. In order to satisfy the requirement, a technology what is called beamforming is sometimes used. Specifically, beamforming improves the beam directionality by controlling the width of the beam emitted from the antenna, thereby making it possible to further improve antenna gain. An example of the antenna configuration capable of implementing such control includes a patch array antenna. For example, Patent Literature 1 discloses one example of such a patch array antenna.

CITATION LIST

Patent Literature

Patent Literature 1: JP 2005-72653 A

SUMMARY

Technical Problem

At the same time, recently, a metal has sometimes been used in the exterior furnishing of antennas to keep the quality of its design. However, because the wavelengths of the millimeter waves are shorter compared with those of centimeter waves or the like, the millimeter waves are reflected more by the metallic exterior furnishing, and the exterior furnishing tends to obstruct the emissions of the millimeter waves to the outside. Therefore, when a metal is used for the exterior furnishing, it is sometimes difficult to achieve a desirable level of gain. In particular, when an array antenna is to be used, it is difficult to achieve a desirable level of gain because a large amount of millimeter waves emitted from the antenna array go through reflections.

Therefore, the present disclosure provides a technology that can suppress a reduction of antenna gain while maintaining the quality of the design of the exterior furnishing of the antenna.

Solution to Problem

According to the present disclosure, an antenna apparatus is provided that includes: an antenna module that includes a first slot antenna that transmits or receives a first wireless signal, a first feed element that supplies power to the first slot antenna, a second slot antenna that transmits or receives a second wireless signal having a polarization direction orthogonal to a polarization direction of the first wireless signal, and a second feed element that supplies power to the second slot antenna; and a metal plate that includes a first slot, and a second slot a longitudinal direction of which is orthogonal to a longitudinal direction of the first slot.

Advantageous Effects of Invention

As explained above, according to the present disclosure, a technology that can suppress a reduction of antenna gain even when a metal is used in the exterior furnishing of the antenna, is provided.

It should be noted that the advantageous effect described above is not necessarily limiting, and any other advantageous effect described herein, or that can be understood from the description herein may be achieved, in addition to or in replacement of the advantageous effect described above.

BRIEF DESCRIPTION OF DRAWINGS

FIG. 1 is a schematic for explaining the characteristics of different types of housing.

DESCRIPTION OF EMBODIMENTS

Figure 2:
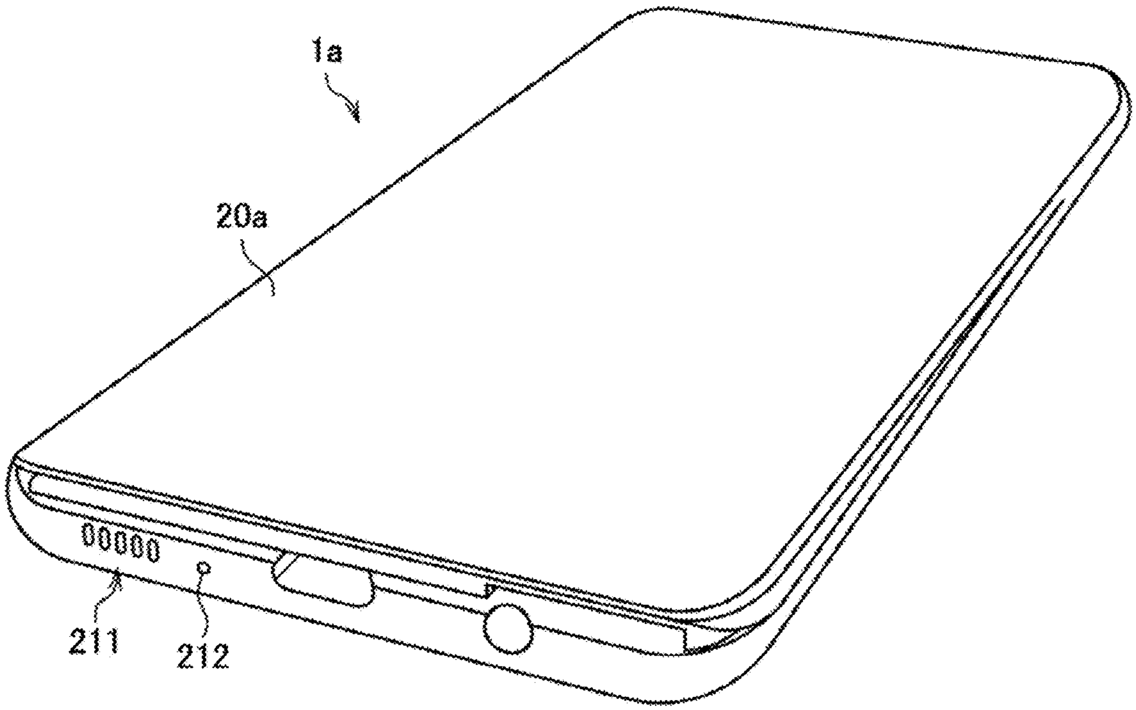
FIG. 2 is a schematic for explaining an example in which holes provided to the housing are used as a propagation channel for electric waves.

Some preferred embodiments according to the present disclosure will now be explained in detail with reference to the appended drawings. In the description herein and the drawings, the elements having substantially the same functional configurations are assigned with the same reference signs, and redundant explanations thereof will be omitted.

The explanations will be provided in the following order.

0. Overview
1. First Embodiment
   1.1. Structure of Antenna Module
   1.2. Structure of Antenna Apparatus
   1.3. Discussions about Antenna Apparatus
   1.4. Modification
2. Second Embodiment
   2.1. Structure of Antenna Module
   2.2. Structure of Antenna Apparatus
   2.3. Discussions about Antenna Apparatus
3. Third Embodiment
   3.1. Structure of Antenna Apparatus
   3.2. Discussions about Antenna Apparatus
   3.3. Modification
4. Shared Use as Sound Hole
5. Application Example
6. Conclusion

0. Overview

To begin with, an overview of embodiments according to the present disclosure will be explained. As to the type of the exterior furnishing of the antenna (housing where the antenna is housed), it is possible to assume different types. Therefore, the characteristics of different types of housing where the antenna is housed will be explained with reference to FIG. 1. In the embodiment of the present disclosure, it is particularly preferable to use millimeter electric waves as the wireless signals transmitted or received by the antenna. However, the type of the electric waves used as the wireless signals transmitted or received by the antenna is not limited to the millimeter electric waves.

FIG. 1 is a schematic for explaining the characteristics of the different types of the housing. Referring to FIG. 1, characteristics (pros and cons) of a "resin model", of a "metal model", and of a "partially removed metal" are illustrated. The "resin model" indicates an example of a structure in which the housing is made of resin (resin housing 231). When the housing is made of resin, because the electric waves emitted from the antenna are less reflected by resin, the emission characteristics of the electric waves from the antenna are not degraded very much (pro). However, when the housing is to be made of resin, resin needs to be used in designing the housing (con).

The "metal model" indicates an example of a structure in which the housing is made of metal (metallic member 232). When the housing is made of metal, the design of the metallic housing can be maintained (pro). However, if the housing is made of metal (because the wavelengths of millimeter electric waves are shorter than those of the centimeter electric waves or the like), when there is some metal in the directions in which the electric waves are emitted, the electric waves are more likely to be reflected by the metal, and it is less likely for the electric waves to be emitted outside of the housing (con). Therefore, when the housing is made of metal and the direction in which the electric waves are emitted from the antenna is covered by the metal, there are times in which it is difficult to obtain a desirable gain.

The "partially removed metal" is an example in which the housing is made of metal (metallic member 232), but some cutouts are provided to portions of the metal in the directions in which the electric waves are emitted. In a configuration in which the cutouts are provided to the portions of the metal in which the directions in which the electric waves are emitted, because it is less likely for the electric waves emitted from the antenna to be reflected by the metal, it is less likely for the emission characteristics of the electric waves emitted from the antenna to be affected thereby (pro). However, if the cutouts are provided to the housing metal, there might be some cases in which the quality of the design of the housing deteriorates (con).

In consideration of the situation described above, the present disclosure provides a technology that can suppress a reduction of antenna gain while maintaining the quality of the design of the housing where the antenna is housed. Specifically, holes provided to the housing, instead of the cutouts provided to the housing, are used as a propagation channel for the electric waves. In this manner, the quality of the design of the housing is maintained, and a reduction of antenna gain is also suppressed, because the electric waves are more likely to be emitted through the holes.

Figure 3:
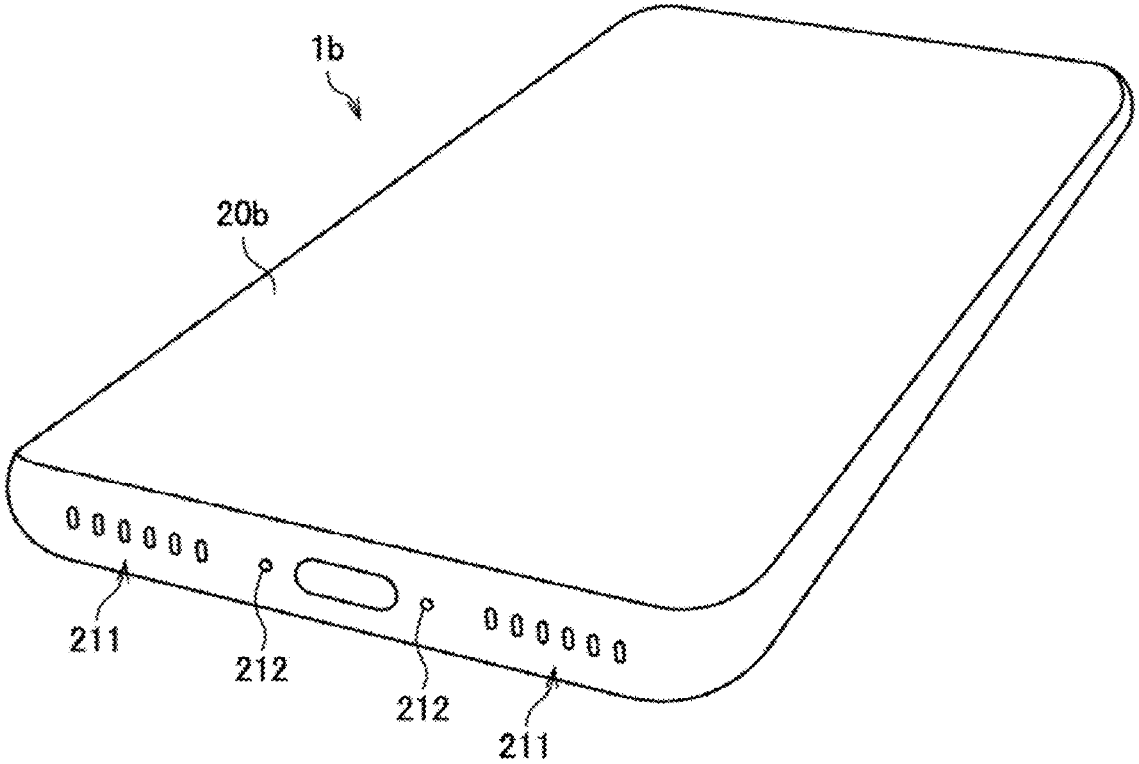
FIG. 3 is a schematic for explaining an example in which holes provided to the housing are used as a propagation channel for the electric waves.

FIGS. 2 and 3 are schematics for explaining an example in which the hole provided to the housing is used as a propagation channel for the electric waves. Referring to FIG. 2, holes 211 and a hole 212 are provided to a housing 20*a* of a communication terminal 1*a* (such as a smartphone). Referring to FIG. 3, two sets of holes 211 and two holes 212 are provided to a housing 20*b* of a communication terminal 1*b* (such as a smartphone). While the holes 211 are used as a propagation channel for the sound output from an internal speaker in the housing to the outside of the housing, the holes 212 are used as a propagation channel for a sound input to the microphone inside the housing, from the outside of the housing.

In the embodiment of the present disclosure, these hole provided to the housing are used as the propagation channel for the electric waves. However, the examples illustrated in FIGS. 2 and 3 are merely some examples of the usage of the holes provided to the housing as a propagation channel for the electric waves. Therefore, in the embodiments of the present disclosure, it is also possible to use another hole provided to the housing (e.g., a hole used as a propagation channel through which internal heat in the housing is dissipated to the outside of the housing) as a propagation channel for the electric waves.

An overview of the embodiment of the present disclosure has been explained above.

1. First Embodiment

A first embodiment of the present disclosure will now be explained. An antenna apparatus according to the first embodiment of the present disclosure includes an antenna module and a metal plate. The metal plate makes up at least a part of a predetermined housing, and the antenna module is housed in the housing. In the first embodiment of the present disclosure, mainly assumed is a configuration in which the antenna apparatus is mounted on a communication terminal such as a smartphone (in other words, the metal plate makes up at least a part of the housing of the communication terminal). However, there is no limitation to the type of the terminal on which the antenna apparatus is to be mounted.

In the explanation hereunder, for the purpose of convenience, among the outer surfaces of the communication terminal, the surface provided with the screen will be sometimes referred to as a "front surface", and, among the outer surfaces of the communication terminal, the surface on the side opposite to the front surface will be sometimes referred to as a "rear surface". Furthermore, in the explanation hereunder, the side on which the "front surface" is present with respect to inside of the communication terminal will be sometimes referred to as "front side", and the side on which the "rear surface" is present with respect to the inside of the communication terminal will be sometimes referred to as a "rear side". In the explanation hereunder, the antenna module will be mainly explained to begin with, and the metal plate will then be explained later.

<1.1. Structure of Antenna Module>

Figure 4:
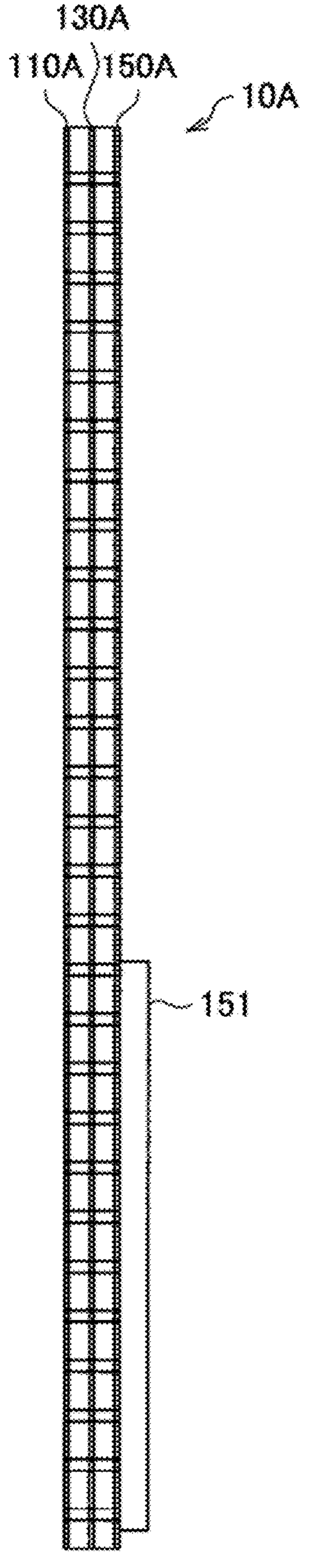
FIG. 4 is a side view of an antenna module according to a first embodiment of the present disclosure.

An exemplary configuration of the antenna module according to the first embodiment of the present disclosure will now be explained with reference to FIGS. 4 to 7. FIG. 4 is a side view of the antenna module according to the first embodiment of the present disclosure. As illustrated in FIG. 4, this antenna module 10A according to the first embodiment of the present disclosure includes a three-layer substrate (a front-side layer 110A, an inner layer 130A, and a rear-side layer 150A). However, the antenna module 10A does not necessarily need to include the three-layer substrate, as long as a multi-layer substrate is included. A radio frequency integrated circuit (RFIC) 151 is mounted on the rear-side surface of the rear-side layer 150A.

Figure 5:
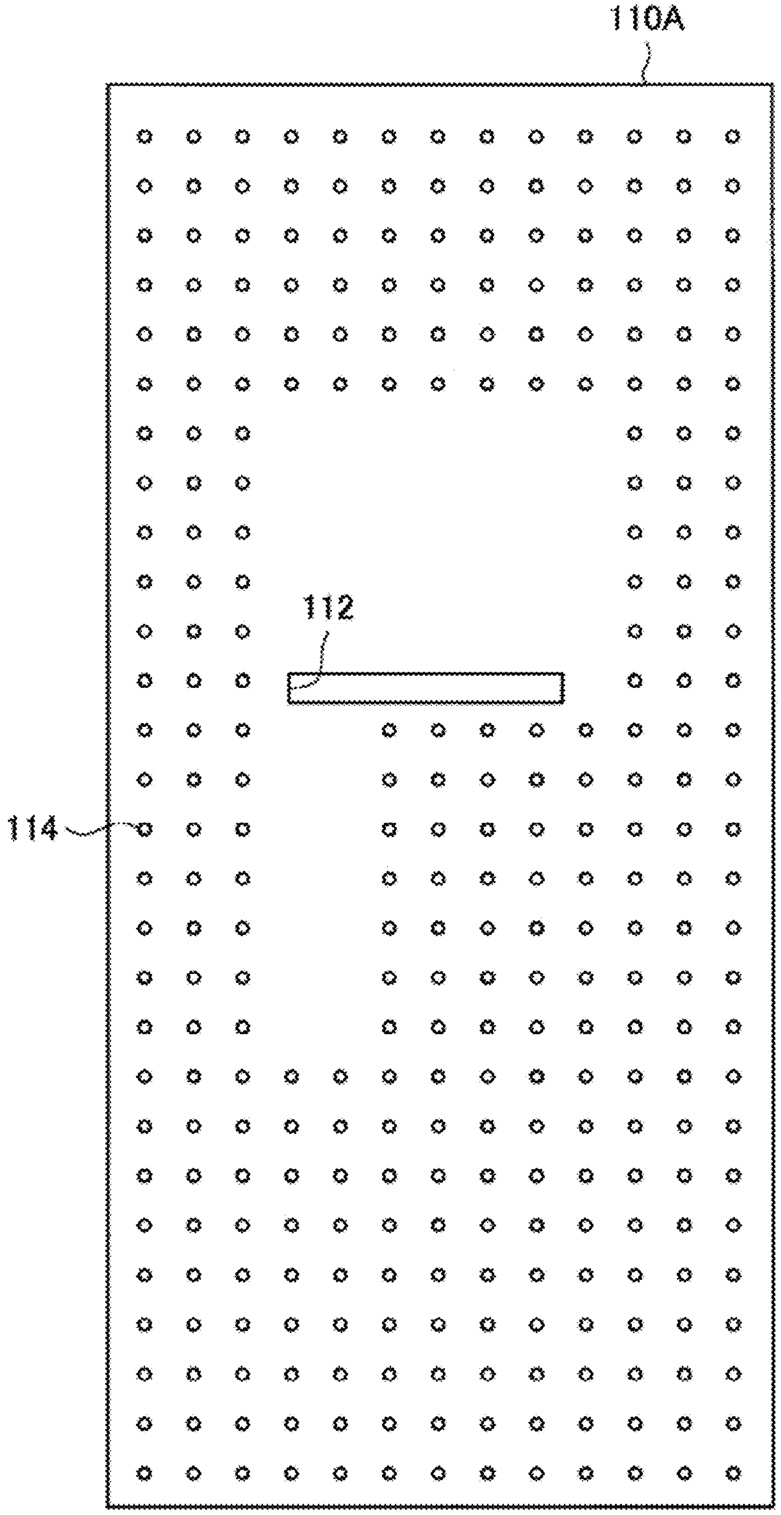
FIG. 5 is a schematic of an inner layer viewed from the rear side.
Figure 6:
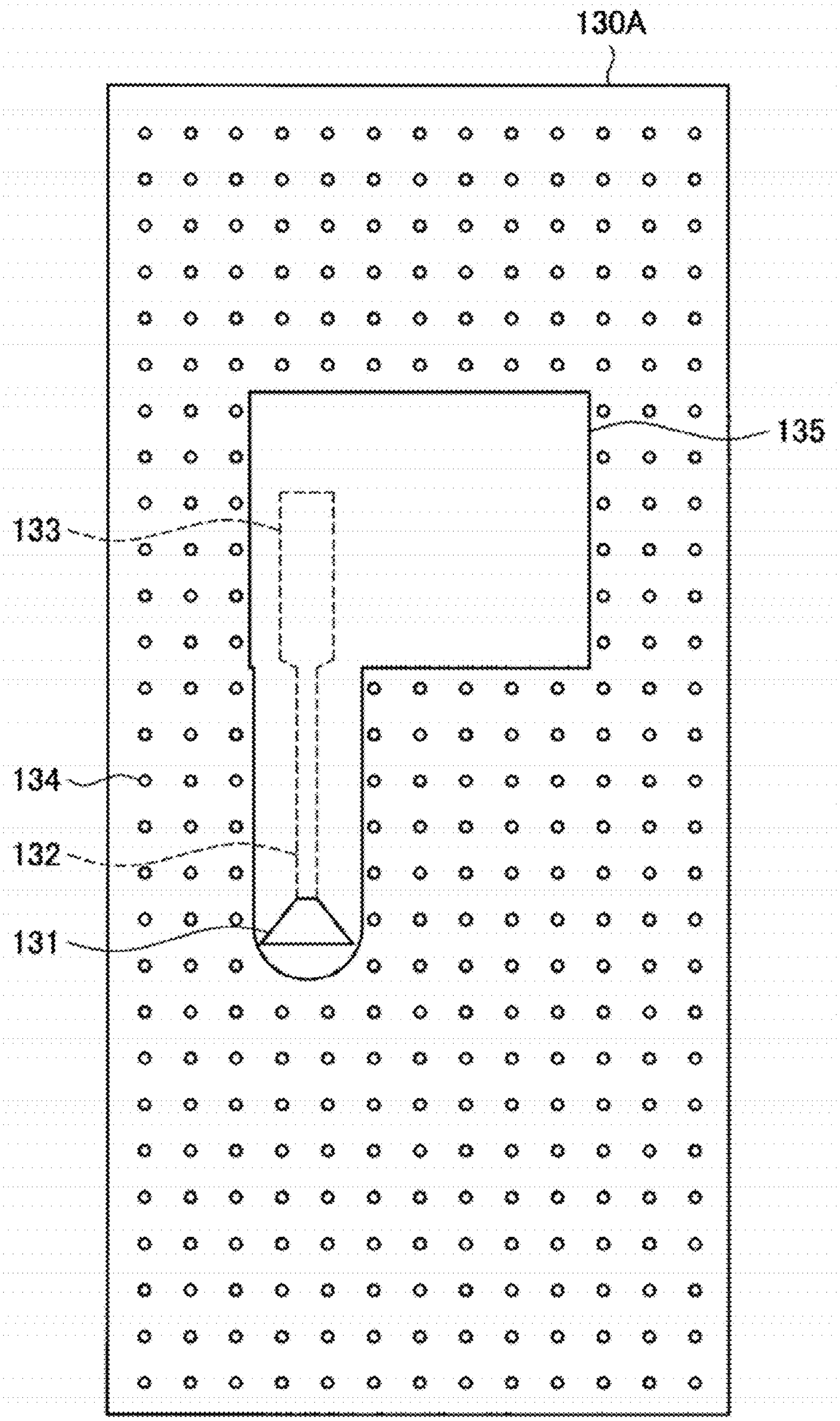
FIG. 6 is a schematic of the inner layer viewed from the rear side.
Figure 7:
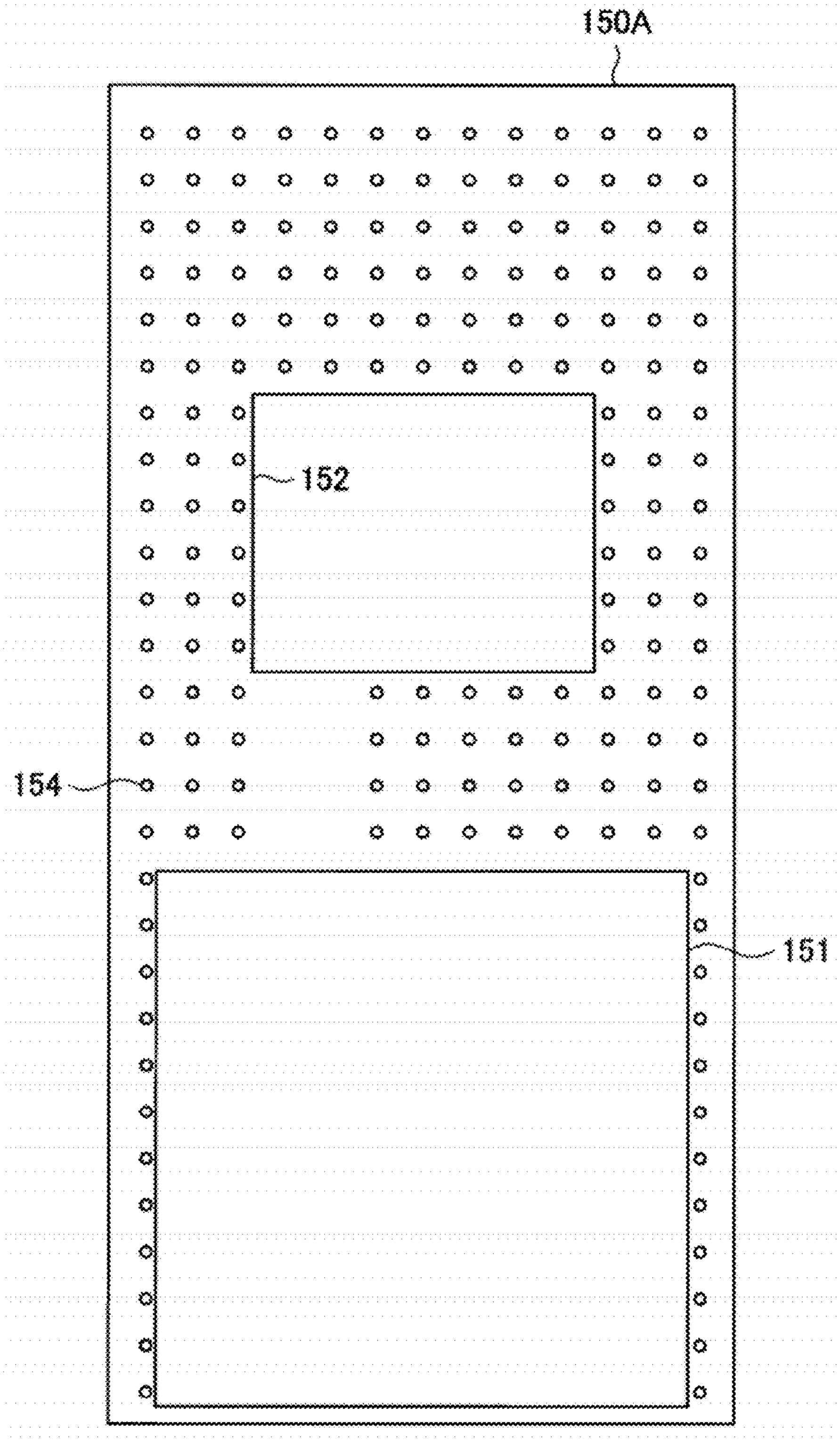
FIG. 7 is a schematic of a rear-side layer viewed from the rear side.

FIG. 5 is a schematic of the front-side layer 110A viewed from the rear side. As illustrated in FIG. 5, the front-side layer 110A (first substrate) has a slot 112 and vias 114. FIG. 6 is a schematic of the inner layer 130A viewed from the rear side. As illustrated in FIG. 6, the inner layer 130A (third substrate) has an inner layer line 132, a strip line (feed element) 133, vias 134, and a GND cutout 135. FIG. 7 is a schematic of the rear-side layer 150A viewed from the rear side. As illustrated in FIG. 7, the rear-side layer 150A (second substrate) has an RFIC 151, a hole 152, and vias 154.

The RFIC 151 is an integrated circuit that processes the wireless signals received by the antenna slot. The RFIC 151 is also an integrated circuit that processes the wireless signals transmitted by the antenna slot. At this time, the RFIC 151 supplies the power serving as a source of the wireless signals to be transmitted to a feed point 131 on the inner layer 130A.

The hole 152 is a through hole provided to the area that faces the GND cutout 135.

The vias 154 are connected to the vias 134 on the inner layer 130A, thereby electrically stabilizing ground (GND) of the rear-side layer 150A. The number of the vias 154 is not limited to any particular number, but it is preferable for the interval between the adjacent vias to be equal to or smaller than ¼ of the electric wavelength A of the wireless signals to be transmitted or received by the slot antenna.

The GND cutout 135 is provided to the hole of the inner layer 130A. The feed point 131 receiving the power from the RFIC 151 provided to the rear-side layer 150A supplies the power to the inner layer line 132. The inner layer line 132 is provided to the surface on the front side of the GND cutout 135, and, when the supply of the power is received from the feed point 131, communicates the power to the strip line 133. The strip line 133 is provided on the surface on the front side of the GND cutout 135, and, when the power is communicated from the inner layer line 132, supplies the power to the slot 112 on the front-side layer 110A, based on the power communicated from the inner layer line 132.

The vias 134 are connected to the vias 114 on the front-side layer 110A, and the vias 154 on the rear-side layer 150A, thereby electrically stabilizing ground (GND) of the inner layer 130A. In the same manner as the vias 154 on the rear-side layer 150A, the number of the vias 134 is not limited to any particular number, and it is preferable for the interval between the adjacent vias to be equal to or smaller than ¼ of the electric wavelength A of the wireless signals transmitted or received by the slot antenna.

The slot 112 is provided as an elongated through hole, and makes up a slot antenna. The elongated through hole is surrounded by two long sides and two short sides. The size of the long sides corresponds to the slot length, and the size of the short sides corresponds to the slot width. The long-side direction corresponds to the longitudinal direction of the slot 112, and the short-side direction corresponds to the short-hand direction of the slot 112. When the power supply from the strip line 133 of the inner layer 130A is received, the slot 112 emits electric waves (transmits wireless signals) based on the power supply.

The vias 114 are connected to the vias 134 on the inner layer 130A, thereby electrically stabilizing ground (GND) of the front-side layer 110A. In the same manner as the vias 154 on the rear-side layer 150A, the number of the vias 114 is not limited to any particular number, and it is preferable for the interval between the adjacent vias to be equal to or smaller than ¼ of the electric wavelength A of the wireless signals transmitted or received by the slot antenna.

An exemplary configuration of the antenna module 10A according to the first embodiment of the present disclosure has been explained above with reference to FIGS. 4 to 7.

<1.2. Structure of Antenna Apparatus>

Figure 8:
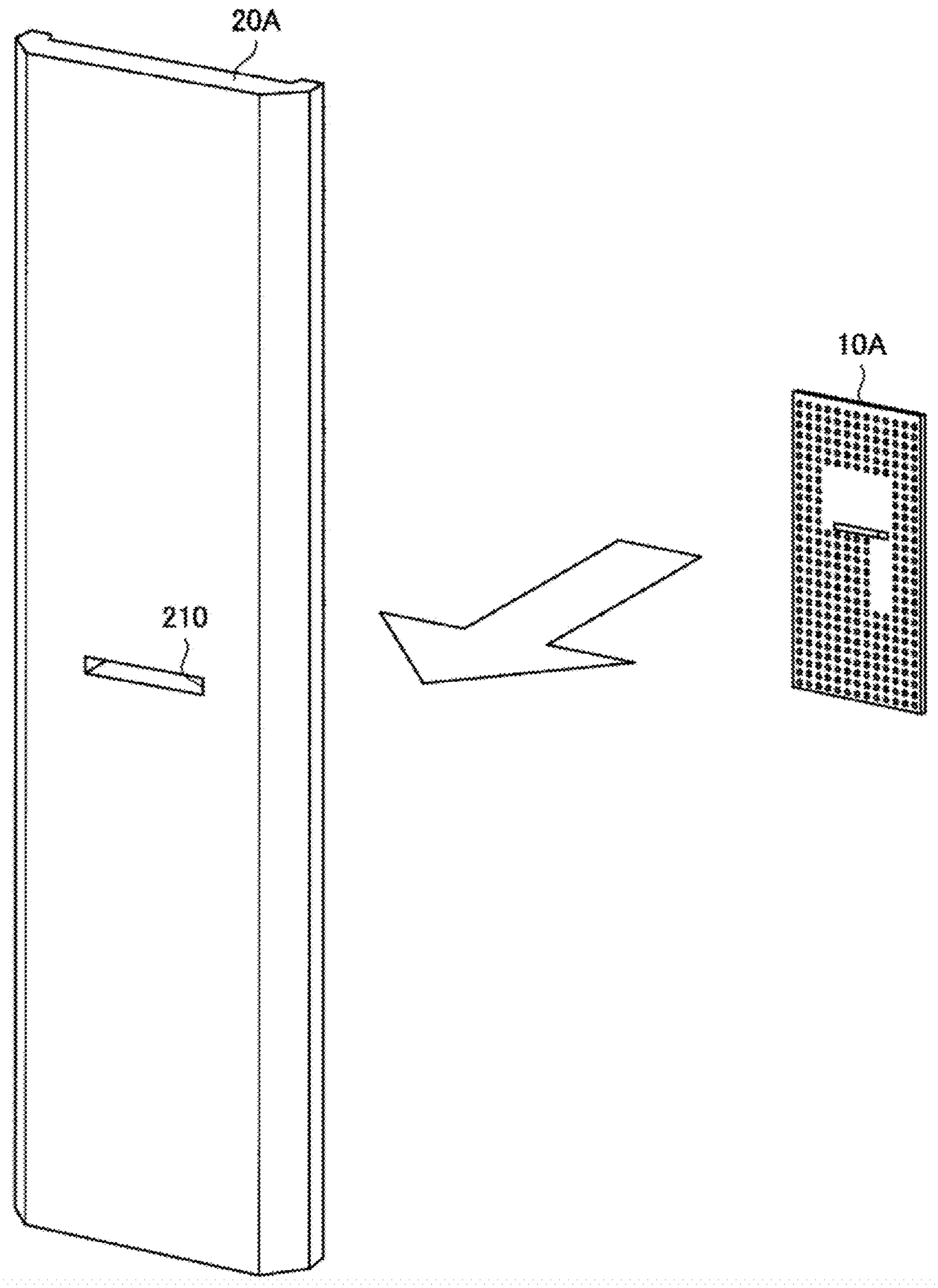
FIG. 8 is an exploded view of the antenna apparatus according to the first embodiment of the present disclosure.

An exemplary structure of the antenna apparatus according to the first embodiment of the present disclosure will now be explained with reference to FIG. 8. FIG. 8 is an exploded view of the antenna apparatus according to the first embodiment of the present disclosure. As illustrated in FIG. 8, the antenna apparatus according to the first embodiment of the present disclosure includes an antenna module 10A and a metal plate 20A. The antenna module 10A is mounted on the inner side of the metal plate 20A. At this time, in order to suppress a degradation of the antenna characteristics, it is preferable for the ground (GND) of the antenna module 10A to be connected reliably with the metal plate 20A. The metal plate 20A may make up at least a part of a predetermined housing. The metal plate 20A is provided with a slot 210.

The slot 210 is provided as an elongated through hole. The elongated through hole is surrounded by two long sides and two short sides. The size of the long sides corresponds to the slot length, and the size of the short sides corresponds to the slot width. The long-side direction corresponds to the longitudinal direction of the slot 210, and the short-side direction corresponds to the short-hand direction of the slot 210. The slot 112 serves as a propagation channel for the electric waves emitted (wireless signals transmitted) from the slot 112 of the antenna module 10A.

As explained above, with the antenna apparatus according to the first embodiment of the present disclosure, the slot 210 provided to the housing is used as a propagation channel for the electric waves emitted (wireless signals transmitted) from the slot 112 of the antenna module 10A. This configuration not only maintains the quality of the design of the housing, but also a reduction of antenna gain is suppressed because the slot 210 enables the electric waves to be emitted more easily (makes it easy to transmit the wireless signals).

In order for the slot 210 to function as a propagation channel for the electric waves emitted (the wireless signals transmitted) from the slot 112 of the antenna module 10A, effectively, it is preferable for the slot 210 to be provided at a position facing the slot 112 on the antenna module 10A. However, there is no limitation in the position of the slot 210. From the same regard, it is preferable for the length of the slot 210 in the longitudinal direction to be substantially the same as the length of the slot 112 on the antenna module 10A in the longitudinal direction. However, there is no limitation to the direction of the slot 210.

An exemplary structure of the antenna apparatus according to the first embodiment of the present disclosure has been explained above with reference to FIG. 8.

<1.3. Discussions about Antenna Apparatus>

Discussions about the antenna apparatus according to the first embodiment of the present disclosure will be now provided below, with reference to FIGS. 9 and 10. More specifically, a discussion will be made as to whether there is any room for improvement in the antenna apparatus according to the first embodiment of the present disclosure.

Figure 9:
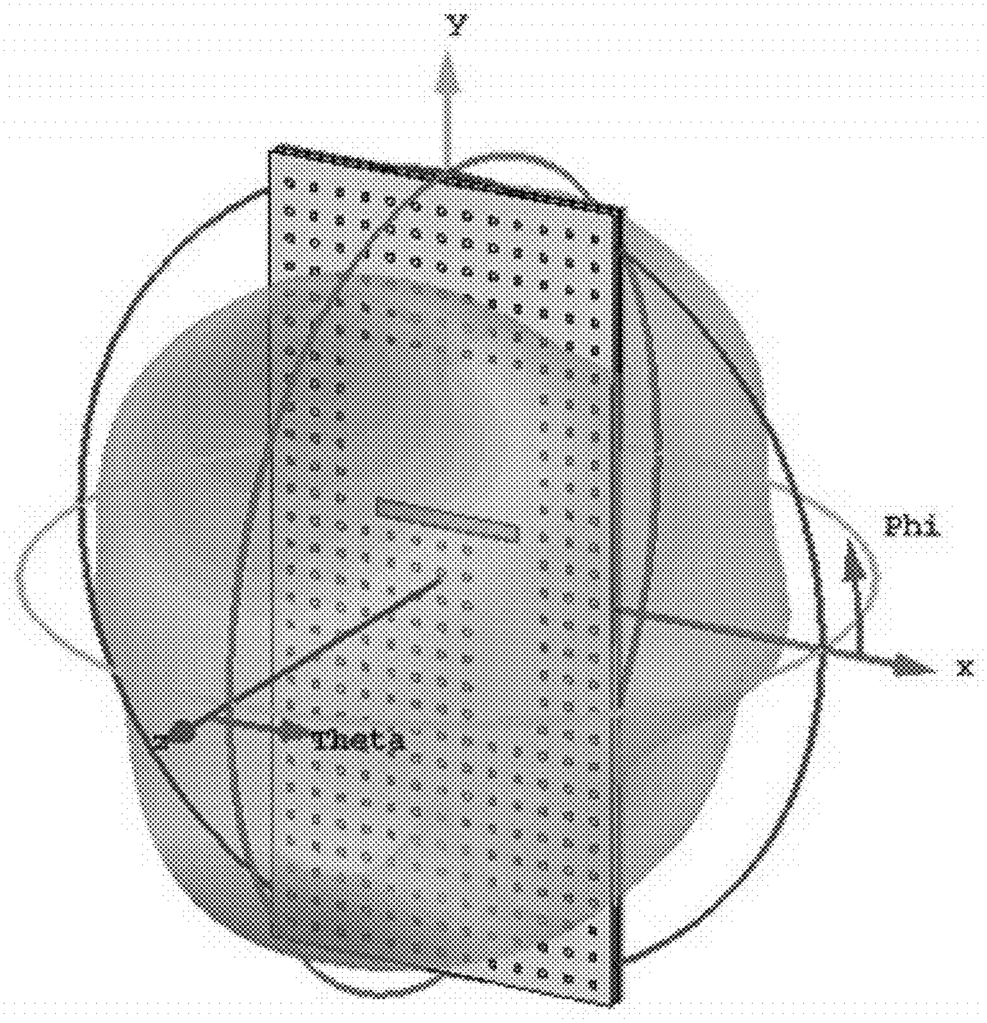
FIG. 9 is a schematic illustrating an example of a simulation result of the emission pattern of electric waves by the antenna apparatus according to the embodiment.
Figure 10:
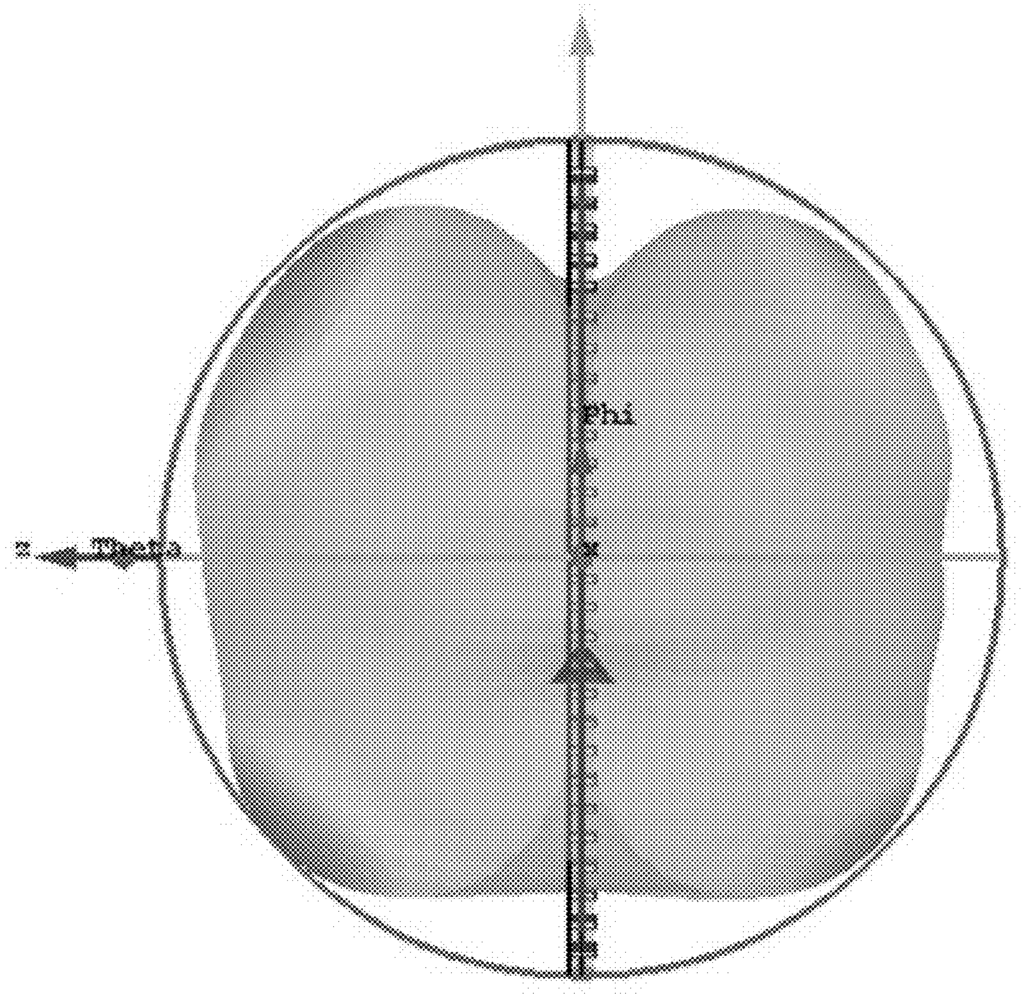
FIG. 10 is a schematic illustrating an example of a simulation result of the emission pattern of electric waves by the antenna apparatus according to the embodiment.

FIGS. 9 and 10 are schematics illustrating some examples of simulation results of the emission patterns of the electric waves from the antenna apparatus according to the first embodiment of the present disclosure. Particularly, the example illustrated in FIG. 9 is a simulation result with the antenna apparatus viewed from the diagonally front side, and the example illustrated in FIG. 10 is a simulation result with the antenna apparatus viewed from a lateral side. In the example illustrated in FIGS. 9 and 10, the area with a higher gain is represented in a darker color.

Referring to the simulation results illustrated in FIGS. 9 and 10, it can be seen that the electric waves are emitted rearwards as well as frontwards, from the antenna apparatus according to the first embodiment of the present disclosure. However, from the viewpoint of further improving antenna gain by improving the beam directionality through control of the antenna beam width with beamforming, the antenna directionality needs to be kept to one direction. Therefore, as a "first improvement", it is preferable to suppress the rearward emission of the electric waves from the antenna apparatus (in other words, it is preferable to increase the frontward emissions of the electric waves from the antenna apparatus).

Furthermore, mainly explained above is an example in which one slot antenna is provided. However, in the fifth generation (5G) mobile communication systems, for example, beamforming capability with an antenna is required. As an antenna configuration with the capability to implement the beamforming, it is suitable to use an array antenna in which a plurality of antennas are arranged in an array. When a plurality of antennas are arranged in an array, the space occupied by the antenna tends to increase. Therefore, as the "second improvement", when an antenna array is used, an antenna arrangement capable of achieving a space saving is required.

Discussions about the antenna apparatus according to the first embodiment of the present disclosure have been provided above with reference to FIGS. 9 and 10. In the explanation hereunder, as an antenna apparatus with an improvement for the "first improvement" explained above, an antenna apparatus according to a modification of the first embodiment of the present disclosure will be explained, and as an antenna apparatus with an improvement for the "second improvement", an antenna apparatus according to a second embodiment of the present disclosure will now be explained.

<1.4. Modification>

An antenna apparatus according to a modification of the first embodiment of the present disclosure will now be explained with reference to FIGS. 11 to 14.

Figure 11:
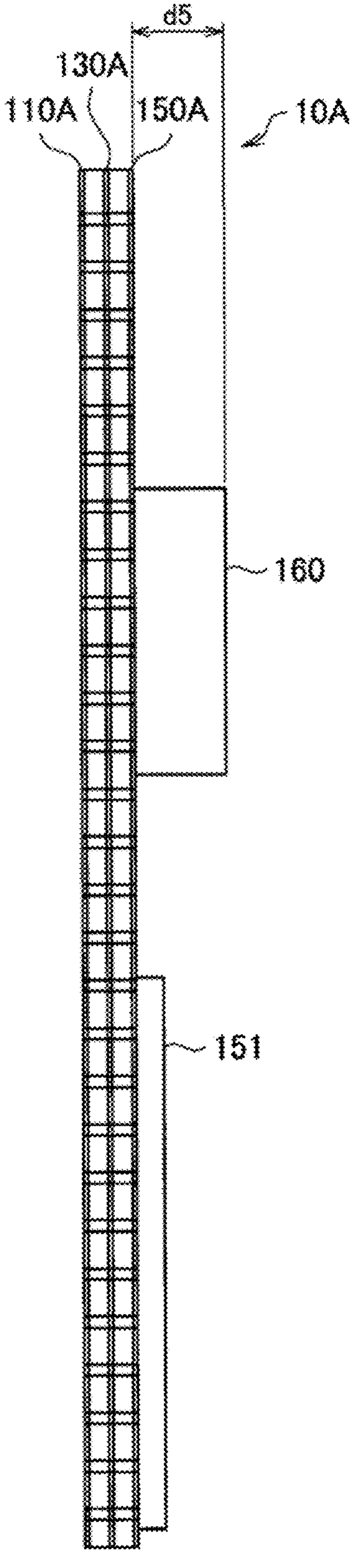
FIG. 11 is a side view of an antenna module according to a modification of the embodiment.

FIG. 11 is a side view of an antenna module according to the modification of the first embodiment of the present disclosure. As illustrated in FIG. 11, on this antenna module 10A according to the modification of the first embodiment of the present disclosure, a shield 160 is mounted. Referring to FIG. 11, the thickness of the shield 160 is indicated as d5. The thickness d5 of the shield 160 will be explained later, together with d1 to d4 (FIG. 13).

The other aspects of the antenna module 10A according to the modification of the first embodiment of the present disclosure are the same as those of the antenna module 10A according to the first embodiment of the present disclosure. Therefore, detailed explanations of the structure of the antenna module 10A according to the modification of the first embodiment of the present disclosure will be omitted.

Figure 12:
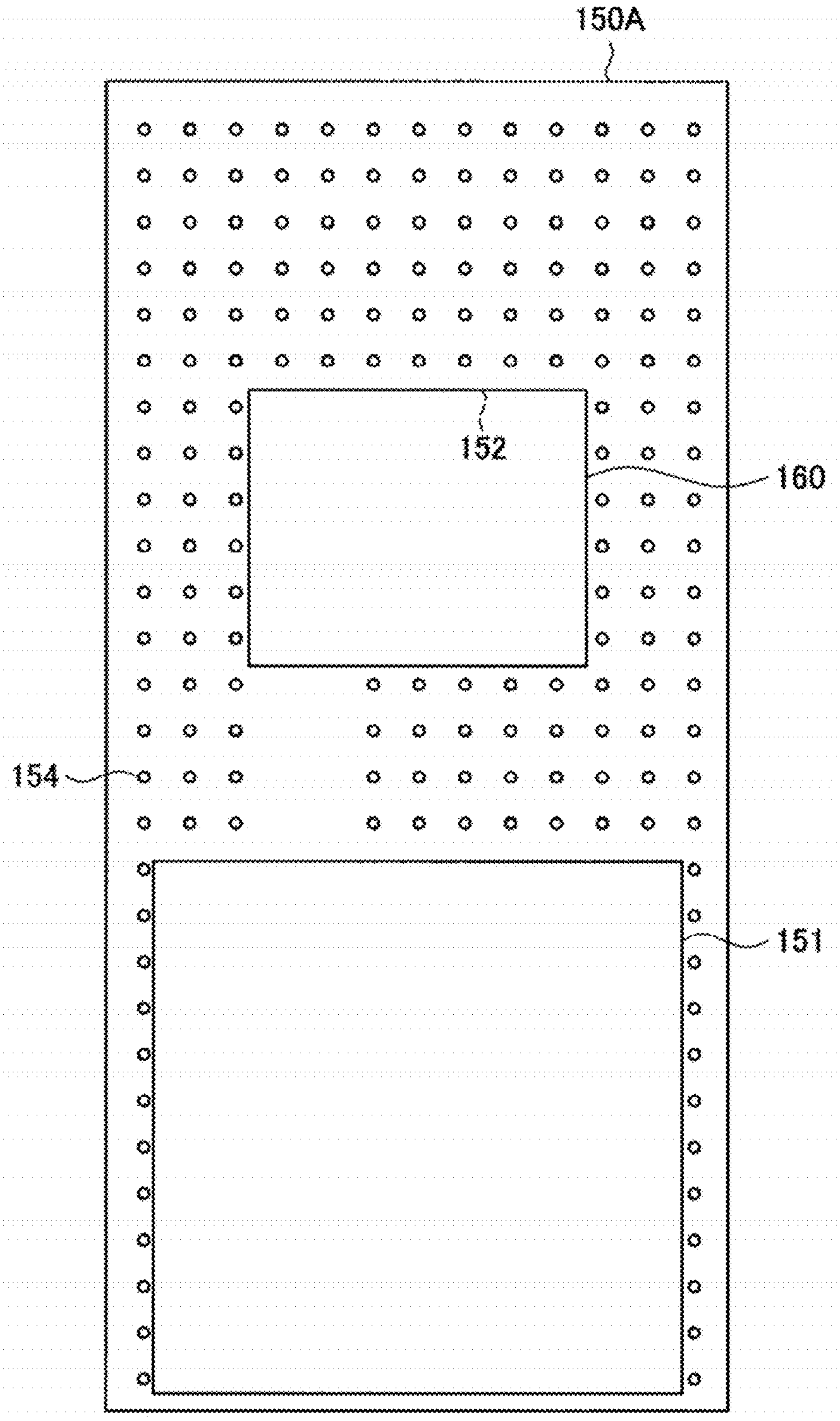
FIG. 12 is a schematic of the rear-side layer viewed from the rear side.

FIG. 12 is a schematic of the rear-side layer 150A viewed from the rear side. In the same manner as in the first embodiment of the present disclosure, the rear-side layer 150A (second substrate) includes the RFIC 151, the hole 152, and the vias 154. However, in the modification of the first embodiment of the present disclosure, the shield 160 is mounted on the rear side of the rear-side layer 150A (on the side opposite to the front-side layer 110A having the slot 112). A typical material of which the shield 160 is made may be a metal, but may be any conductor that is highly conductive. For example, as illustrated in FIG. 12, the shield 160 may be mounted on the position facing the hole 152. It is preferable, when the shield 160 is mounted, for the shield 160 to be electrically connected to the substrate GND.

Figure 13:
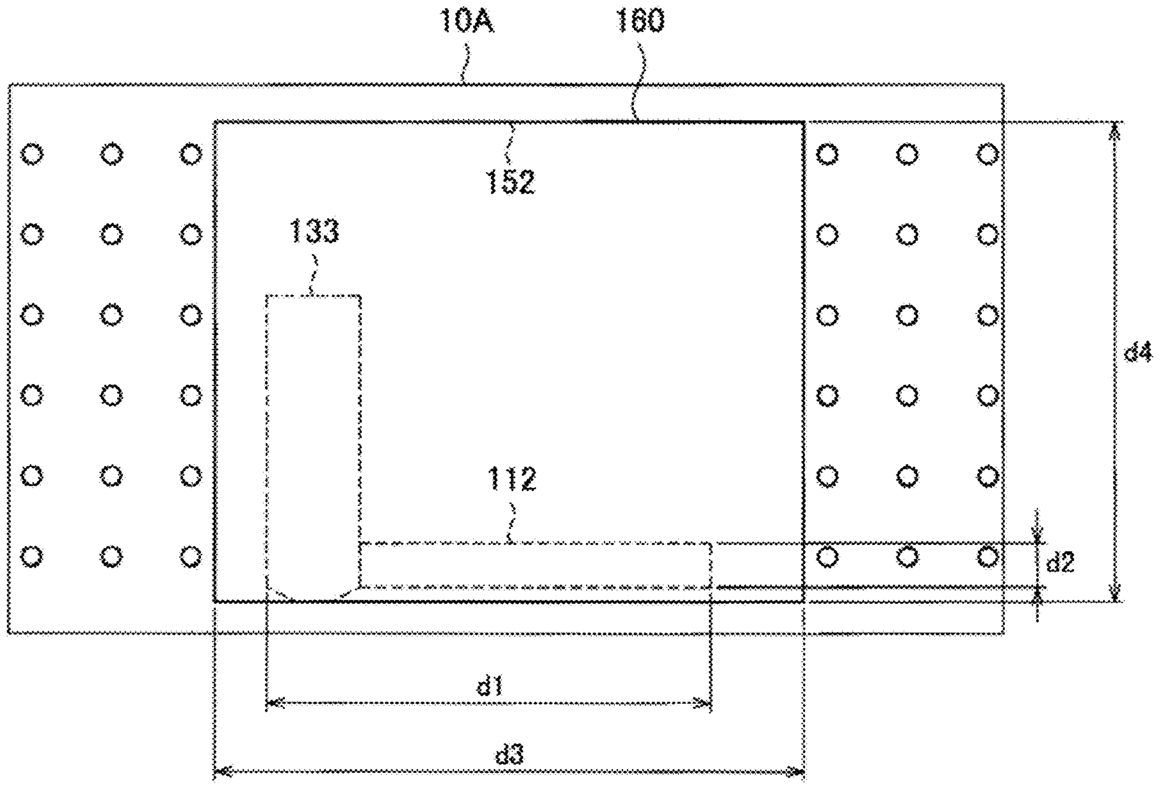
FIG. 13 is an enlarged view of a shield, and the portions around the shield, in the antenna module.

FIG. 13 is an enlarged view of the shield 160, and portions around the shield, in the antenna module 10A. As illustrated in FIG. 13, it is preferable for the size d1 of the slot 112 in the longitudinal direction to be the substantially ½ the electric wavelength A of the wireless signal transmitted or received by the slot antenna (substantially a half electric wavelength of the electric wavelength A). When such a condition is satisfied, it can be expected that larger electric waves are emitted due to the resonance at the slot. Furthermore, it is preferable for the size d2 of the slot 112 in the short-hand direction to be 1 mm or so, but the size may be adjusted as appropriate, based on the desired bandwidth. For example, the size d2 may be increased to achieve a narrower bandwidth.

It is preferable for the size d3 of the hole 152 in the direction extending substantially in parallel with the longitudinal direction of the slot 112 to be substantially ½ the electric wavelength A of the wireless signal transmitted or received by the slot antenna (substantially a half electric wavelength of the electric wavelength A)+a (because the hole 152 is positioned on the side opposite to the strip line 133 with reference to the GND cutout 135). With this configuration, the chances of the electric waves resonating at the hole 152 can be suppressed. The size of a may be adjusted as appropriate.

It is preferable for the size d4 of the hole 152 in the direction substantially in parallel with the short-hand direction of the slot 112 to be equal to or less than substantially ½ an in-dielectric electric wavelength λd of the wireless signal transmitted or received by the slot antenna (substantially a half electric wavelength of the in-dielectric electric wavelength Ad), (because the hole 152 is positioned on the side opposite to the strip line 133 with reference to the GND cutout 135). With this configuration, the chances of the electric waves resonating at the hole 152 can be suppressed.

It is preferable for the thickness d5 of the shield 160 to be equal to or smaller than substantially ¼ the in-dielectric electric wavelength λd of the wireless signal transmitted or received by the slot antenna (substantially a ¼ electric wavelength of the in-dielectric electric wavelength λd) (because the shield 160 is positioned on the side opposite to the strip line 133 with reference to the GND cutout 135). For example, if the thickness d5 of the shield 160 is set to substantially one time or substantially ½ of the in-dielectric electric wavelength λd, rearward emissions become increased. By setting the thickness d5 of the shield 160 to substantially ¼ the in-dielectric electric wavelength λd, rearward emissions are reduced so that the chances of the communication quality degradations can be suppressed.

As explained above, by mounting the shield 160 on the antenna module 10A, it can be expected that the rearward emissions of the electric waves from the antenna apparatus are suppressed (in other words, it can be expected that the frontward emissions of the electric waves from the antenna apparatus are increased).

Figure 14:
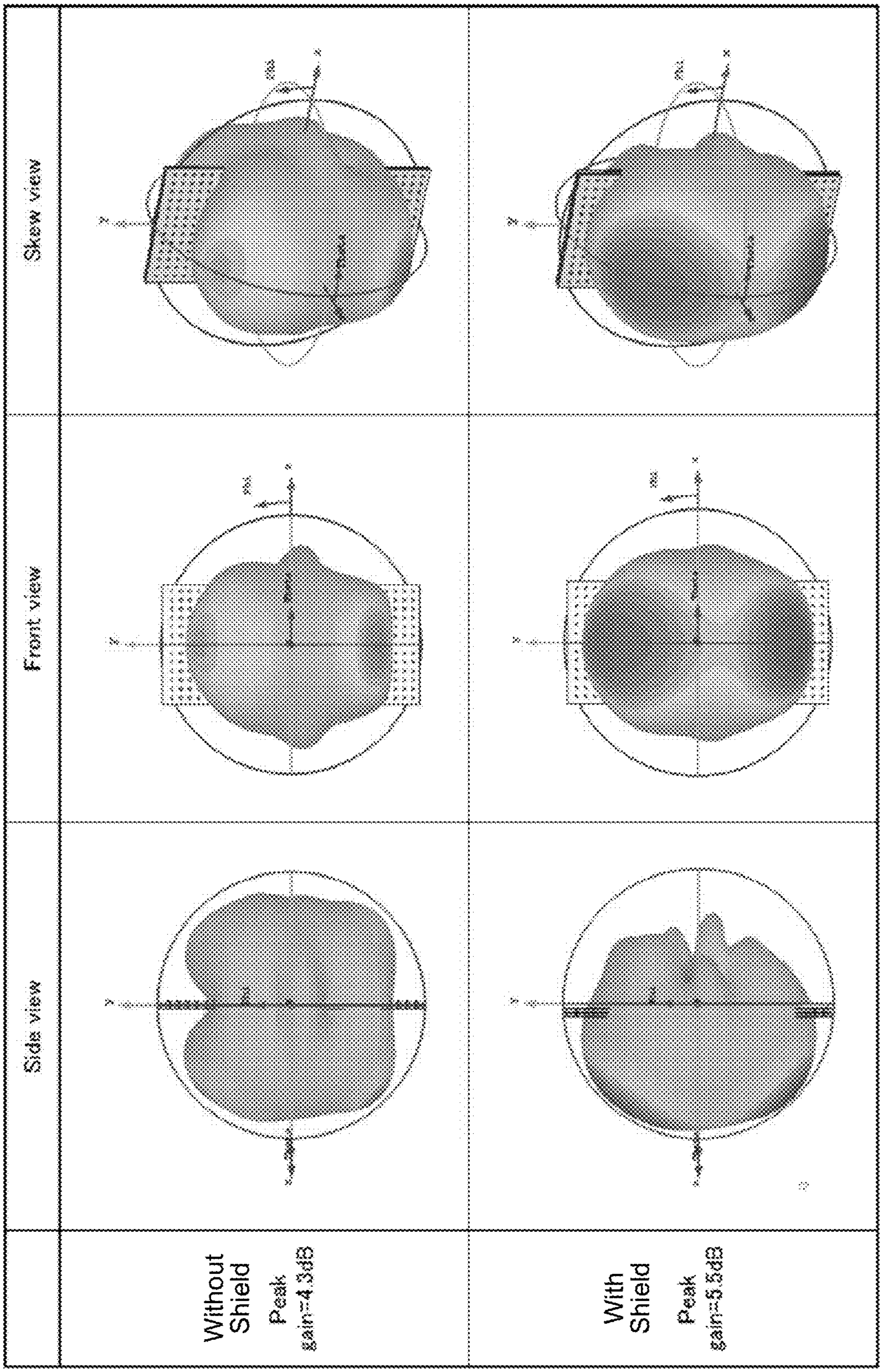
FIG. 14 is a schematic illustrating an example of simulation results of the patterns of electric wave emissions by a slot antenna included in the antenna module according to the modification of the embodiment.

FIG. 14 is a schematic illustrating an example of a simulation result of the emission pattern of electric waves, achieved by the slot antenna in the antenna module 10A according to the modification of the first embodiment of the present disclosure. Particularly, in the example illustrated in FIG. 14, a simulation result without the shield is illustrated in the top row, and a simulation result with the shield is illustrated in the bottom row.

Illustrated in each of the top row and the bottom row are a simulation result with the antenna module 10A seen from the lateral side (side view), a simulation result with the antenna module 10A seen from the front side (front view), and a simulation result with the antenna module 10A seen from the diagonally front side (skew view). In the same manner as in the example illustrated in FIGS. 9 and 10, in FIG. 14, too, the area with a higher gain is represented in a darker color.

Referring to the simulation result illustrated in FIG. 14, it can be seen that, in the configuration with the shield (bottom row), the rearward emissions of the electric waves from the antenna apparatus are suppressed, compared with the configuration without the shield (top row) (in other words, it can be seen that the frontward emissions of the electric waves from the antenna apparatus are increased). To compare the gain peaks, in the configuration without the shield (top row), the gain peak is at 4.3 dB, but in the configuration with the shield (bottom rows), the gain peak is increased to 5.5 dB.

The antenna apparatus according to the modification of the first embodiment of the present disclosure has been explained above with reference to FIGS. 11 to 14.

2. Second Embodiment

A second embodiment of the present disclosure will now be explained.

<2.1. Structure of Antenna Module>

An exemplary configuration of an antenna module according to the second embodiment of the present disclosure will now be explained with reference to FIGS. 15 to 18.

Figure 15:
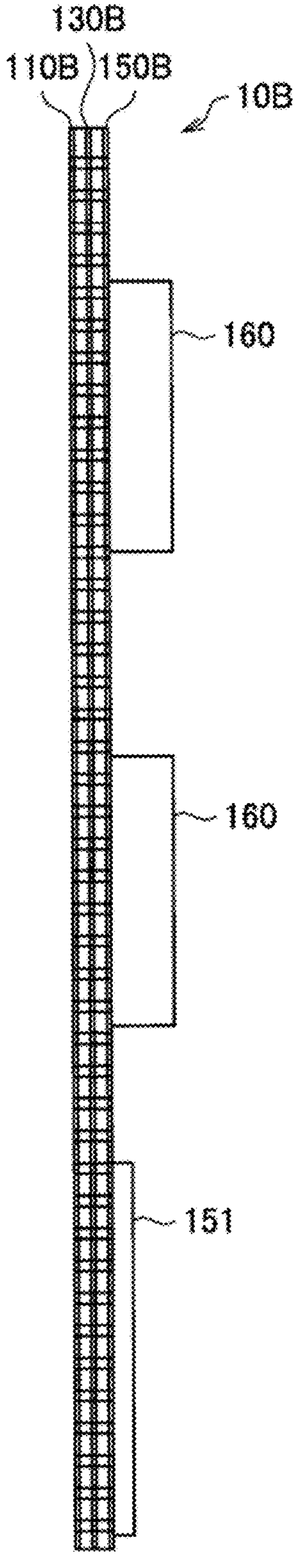
FIG. 15 is a side view of an antenna module according to a second embodiment of the present disclosure.

FIG. 15 is a side view of the antenna module according to the second embodiment of the present disclosure. As illustrated in FIG. 15, the antenna module 10B according to the second embodiment of the present disclosure includes a three-layer substrate (a front-side layer 110B, an inner layer 130B, and a rear-side layer 150B). However, the antenna module 10B does not necessarily need to include the three-layer substrate, as long as a multi-layer substrate is included, in the same manner as in the first embodiment of the present disclosure. Furthermore, in the same manner as in the first embodiment of the present disclosure, the RFIC 151 is mounted on the surface of the rear-side layer 150B on the rear side. However, unlike the first embodiment of the present disclosure, two shields 160 are mounted on the antenna module 10B.

Figure 16:
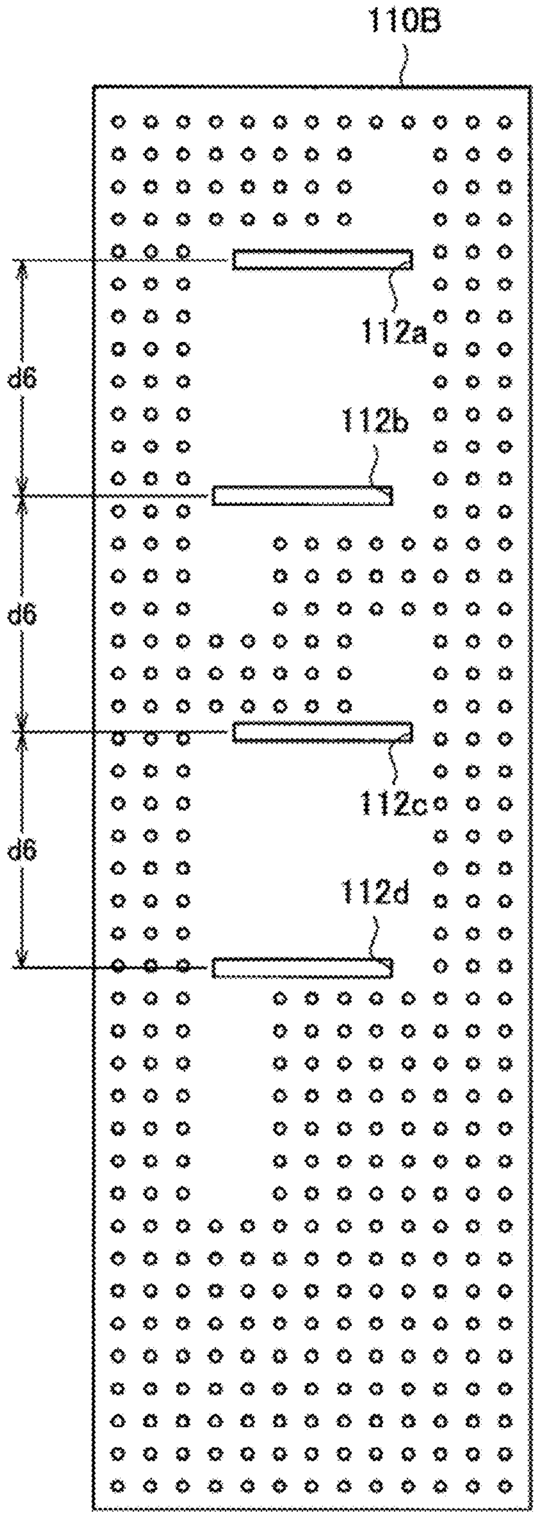
FIG. 16 is a schematic of a front-side layer viewed from the rear side.

FIG. 16 is a schematic of the front-side layer 110B viewed from the rear side. As illustrated in FIG. 16, the front-side layer 110B (first substrate) is different from the front-side layer 110A according to the first embodiment of the present disclosure in that a plurality of slots (slots 112*a* to 112*d*) are provided, instead of one slot. In the second embodiment of the present disclosure, mainly assumed is a configuration in which the number of the slots is four. However, there is no limitation to the number of slots, as long as the number is plural.

When a plurality of slot antennas are put into an array, it is preferable to match the polarization directions of a plurality of wireless signals transmitted or received by the slot antennas, substantially with respect to one another. It also is preferable to set the short-side directions of a plurality of slots in a manner substantially matching the polarization directions of the wireless signals. Therefore, it is preferable to arrange the slots in substantially matching directions. Referring to FIG. 16, because the slots (slots 112*a* to 112*d*) are arranged in substantially matching directions in the horizontal direction (because the polarization directions of the first wireless signals are in the vertical direction). However, the directions of the slots (slots 112*a* to 112*d*) are not limited to the horizontal direction.

To achieve a space saving, it is preferable to arrange a plurality of slots in series, in a manner separated from one another at a predetermined interval (slot interval). Referring to FIG. 16, the slots (slots 112*a* to 112*d*) are arranged in series with a predetermined interval (slot interval) d6 therebetween. It is preferable for the slot interval d6 to be substantially ½ the electric wavelength A (substantially a half electric wavelength of the electric wavelength A) of the first wireless signals transmitted or received by the slot antennas.

Figure 17:
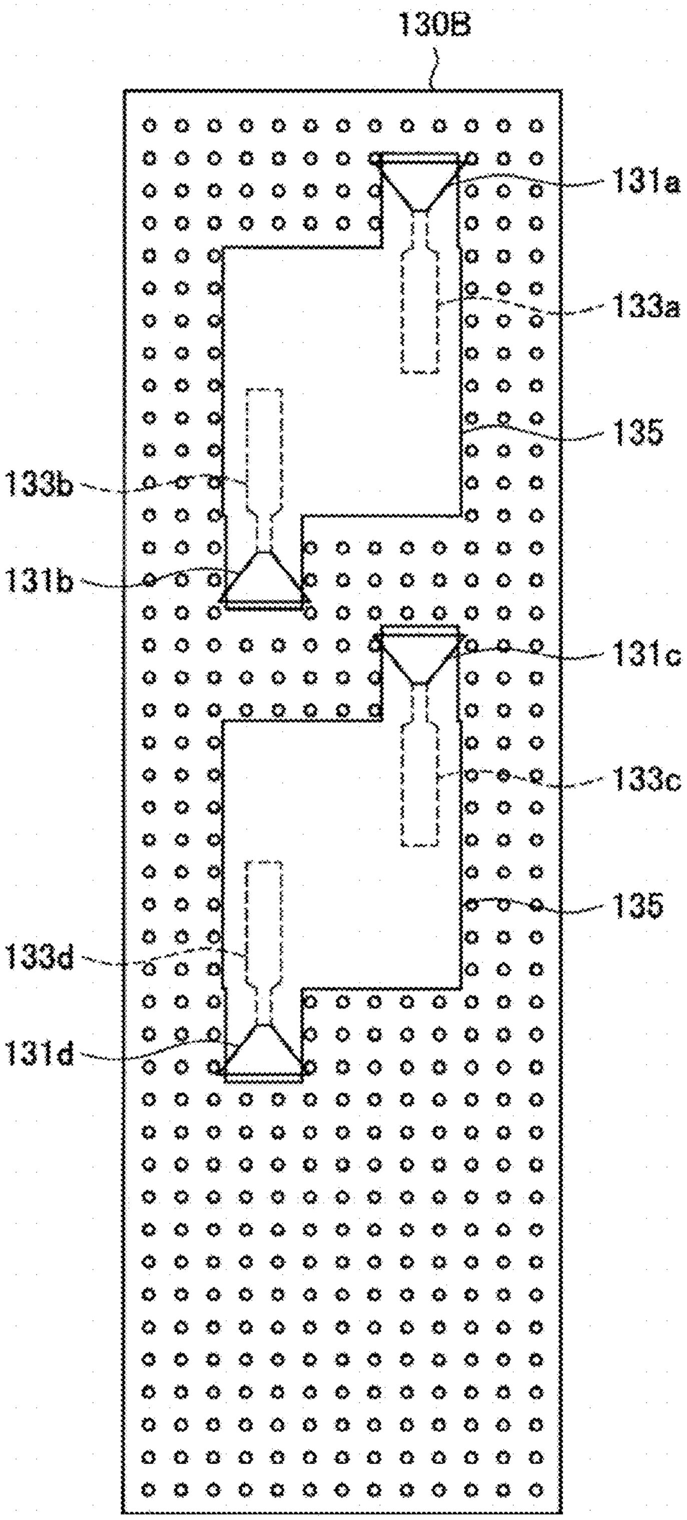
FIG. 17 is a schematic of an inner layer viewed from the rear side.

FIG. 17 is a schematic of the inner layer 130B viewed from the rear side. As illustrated in FIG. 17, the inner layer 130B (third substrate) is different from the inner layer 130A according to the first embodiment of the present disclosure in that the feed point 131 and the strip line (first feed element) 133 are provided correspondingly to each of the slots. Specifically, a feed point 131*a* and a strip line 133*a* are provided for the slot 112*a*; a feed point 131*b* and a strip line 133*b* are provided for the slot 112*b*; a feed point 131*c* and a strip line 133*c* are provided for the slot 112*c*; and a feed point 131*d* and a strip line 133*d* are provided for the slot 112*d*.

Furthermore, as illustrated in FIG. 17, the inner layer 130B (third substrate) is different from the inner layer 130A according to the first embodiment of the present disclosure in that one GND cutout 135 is provided for the two strip lines (first feed elements). Specifically, one GND cutout 135 is provided for the strip lines 133*a* and 133*b*, and one GND cutout 135 is provided for the strip lines 133*c* and 133*d*. The two GND cutouts 135 are provided in the respective holes on the inner layer 130B. The number of the GND cutouts 135 is, however, not limited to any particular number.

When the power supply from the RFIC 151 provided on the rear-side layer 150B is received, the feed point 131*a* communicates the power to the strip line 133*a* via the inner layer line. The strip line 133*a* is provided on a surface on the front side of the corresponding GND cutout 135, and, when the power is communicated from the feed point 131*a* via the inner layer line, supplies the power to the slot 112*a* provided to the front-side layer 110B based on the power.

When the power supply from the RFIC 151 provided on the rear-side layer 150B is received, the feed point 131*b* communicates the power to the strip line 133*b* via the inner layer line. The strip line 133*b* is provided on a surface on the front side of the corresponding GND cutout 135, and, when the power is communicated via the inner layer line from the feed point 131*b*, supplies the power to the slot 112*b* provided to the front-side layer 110B based on the power.

When power supply from the RFIC 151 provided on the rear-side layer 150B is received, the feed point 131*c* communicates the power to the strip line 133*c* via the inner layer line. The strip line 133*c* is provided on a surface on the front side of the corresponding GND cutout 135, and, when the power is communicated via the inner layer line from the feed point 131*c*, supplies the power to the slot 112*c* provided to the front-side layer 110B based on the power.

When power supply from the RFIC 151 provided on the rear-side layer 150B is received, the feed point 131*d* communicates the power to the strip line 133*d* via the inner layer line. The strip line 133*d* is provided on a surface on the front side of the corresponding GND cutout 135, and, when the power is communicated from the feed point 131*d* via the inner layer line, supplies the power to the slot 112*d* provided to the front-side layer 110B based on the power.

Figure 18:
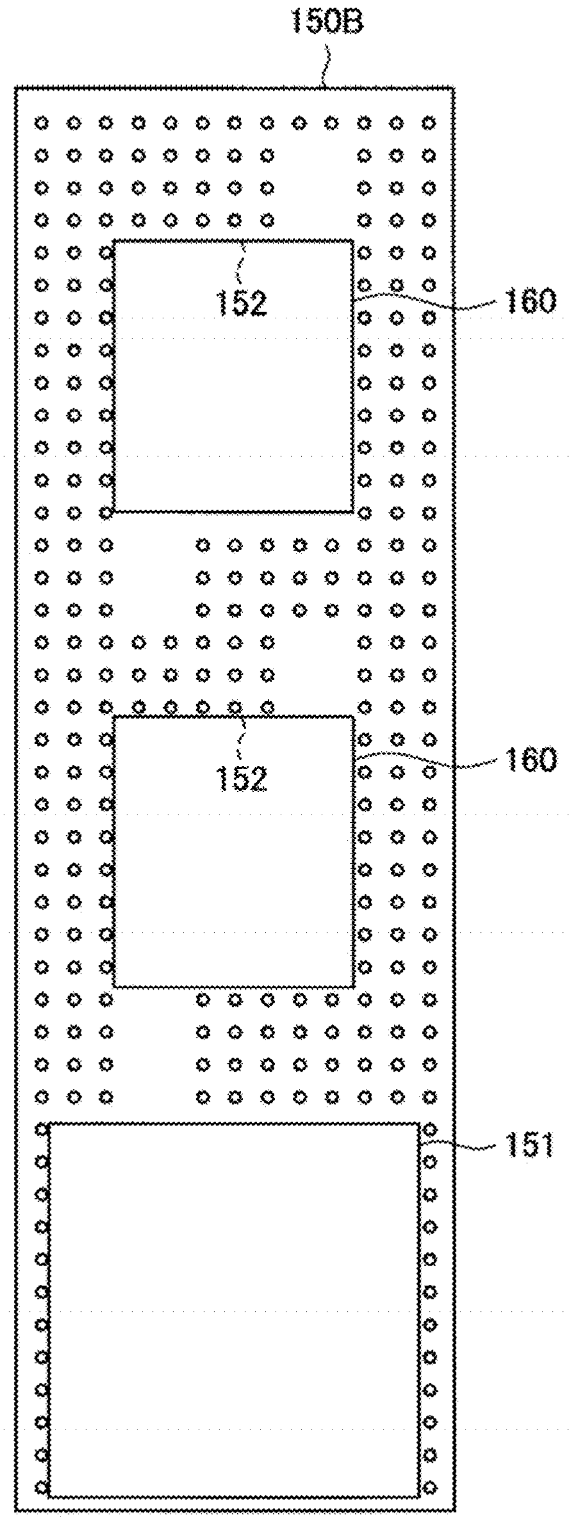
FIG. 18 is a schematic of a rear-side layer viewed from the rear side.

FIG. 18 is a schematic of the rear-side layer 150B viewed from the rear side. As illustrated in FIG. 18, the rear-side layer 150B (second substrate) is different from the rear-side layer 150A according to the first embodiment of the present disclosure in that the two holes 152 are provided. Each of the two holes 152 is provided to the area facing the corresponding GND cutout 135. In the same manner as the number of the GND cutouts 135, the number of the holes 152 is not limited to any particular number. The RFIC 151 supplies the power that is to serve as the source of the first wireless signals to be transmitted, to the feed points 131*a* to 131*d* provided on the inner layer 130B.

Furthermore, as illustrated in FIG. 18, the rear-side layer 150B (second substrate) has two shields 160 that are mounted on the rear side of the rear-side layer 150B (positioned on the side opposite to the front-side layer 110B having the slots 112). For example, as illustrated in FIG. 18, the two shields 160 may be mounted on the positions facing the holes 152, respectively. The number of the shields 160 is not limited to any particular number, in the same manner as the number of the holes 152.

An exemplary configuration of the antenna module 10B according to the second embodiment of the present disclosure has been explained above with reference to FIGS. 15 to 18.

<2.2. Structure of Antenna Apparatus>

Figure 19:
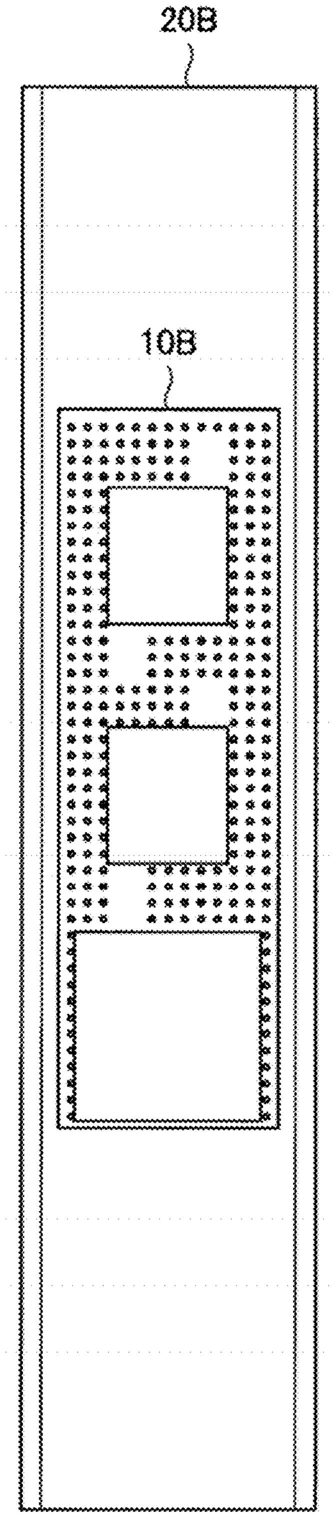
FIG. 19 is a schematic of the antenna apparatus according to the second embodiment of the present disclosure viewed from the rear side.
Figure 20:
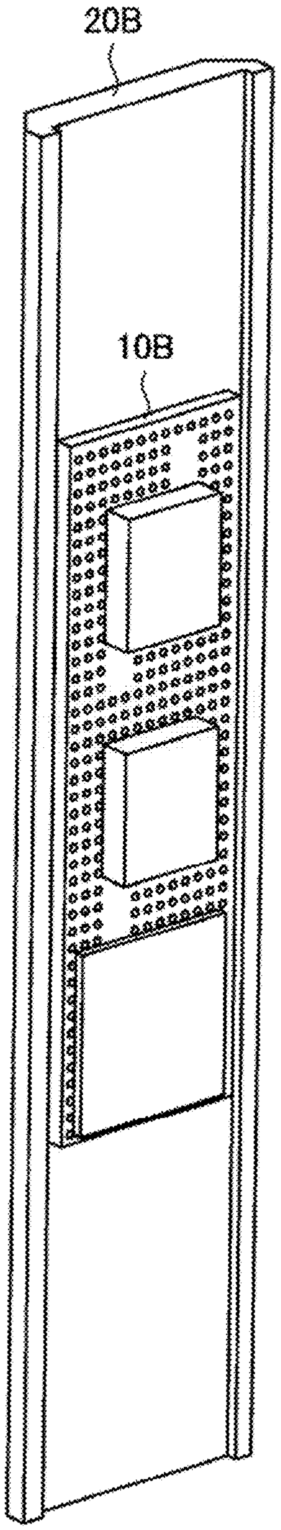
FIG. 20 is a schematic of the antenna apparatus according to the embodiment viewed from a diagonally rear side.

An exemplary structure of an antenna apparatus according to the second embodiment of the present disclosure will now be explained with reference to FIGS. 19 to 21. FIG. 19 is a schematic of the antenna apparatus according to the second embodiment of the present disclosure, viewed from the rear side. FIG. 20 is a schematic of the antenna apparatus according to the second embodiment of the present disclosure, viewed from a diagonally rear side. As illustrated in FIGS. 19 and 20, the antenna apparatus according to the second embodiment of the present disclosure includes the antenna module 10B and a metal plate 20B. The antenna module 10B is mounted on the inner side of the metal plate 20B. At this time, in order to suppress degradations of the antenna characteristics, it is preferable for the ground (GND) of the antenna module 10B to be connected reliably with the metal plate 20B.

Figure 21:
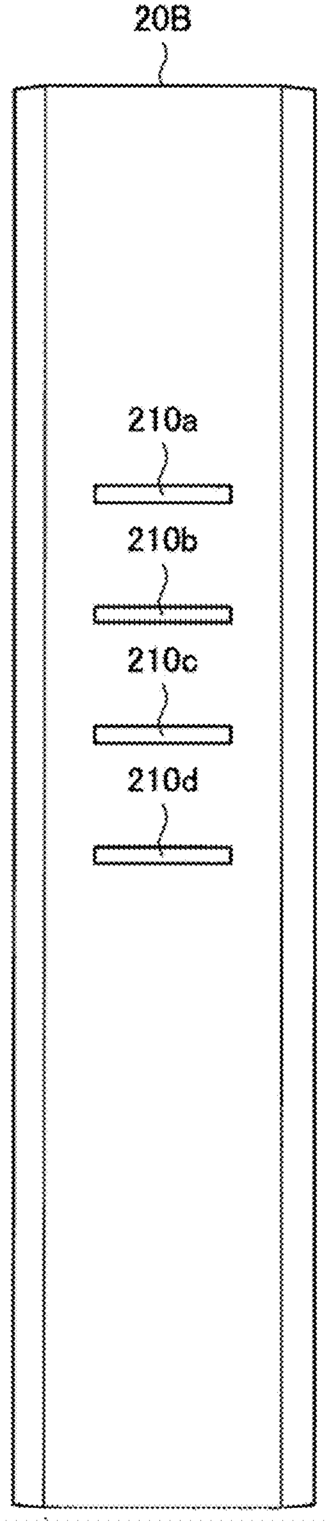
FIG. 21 is a schematic of the antenna apparatus according to the embodiment viewed from the front side.

FIG. 21 is a schematic of the antenna apparatus according to the second embodiment of the present disclosure, viewed from the front side. It is possible for the metal plate 20B to make up at least a part of a predetermined housing. The metal plate 20B is provided with slots 210*a* to 210*d*.

The slot 210*a* serves as a propagation channel for the power emitted from the slot 112*a* provided on the antenna module 10A. In the same manner, the slot 210*b* serves as a propagation channel for the power emitted from the slot 112*b* provided on the antenna module 10A. The slot 210*c* serves as a propagation channel for the power emitted from the slot 112*c* provided on the antenna module 10A. The slot 210*d* serves as a propagation channel for the power emitted from the slot 112*d* provided on the antenna module 10A.

More specifically, it is preferable to match the longitudinal direction of the slot 210*a* and the long-side direction of the slot 112*a* provided on the antenna module 10A.

In the same manner, it is preferable to match the longitudinal direction of the slot 210*b*, the polarization direction of the electric wave emitted from the slot 112*b*, and the longitudinal direction of the slot 112*b*. It is preferable to match the longitudinal direction of the slot 210*b* and the longitudinal direction of the slot 112*c*. It is preferable to match the longitudinal direction of the slot 210*d*, the polarization direction of the power emitted from the slot 112*d*, and the longitudinal direction of the slot 112*d*.

As explained above, with the antenna apparatus according to the second embodiment of the present disclosure, the same effects as those achieved by the antenna apparatus according to the first embodiment of the present disclosure are achieved. Furthermore, in the antenna apparatus according to the second embodiment of the present disclosure, a plurality of slots are arranged in series with a predetermined interval (slot interval) therebetween. With this configuration, a space saving is achieved when an antenna array is used.

<2.3. Discussions about Antenna Apparatus>

Discussions about the antenna apparatus according to the second embodiment of the present disclosure will be provided below, with reference to FIGS. 22 to 29. Specifically, a simulation result achieved in an example in which the slot interval in the metal plate 20B of the antenna apparatus according to the second embodiment of the present disclosure is set to substantially a ¼ electric wavelength of the in-dielectric electric wavelength λd of the wireless signal (=1.7 mm) will be explained with reference to FIGS. 22 to 25. Another simulation result achieved in an example in which the slot interval in the metal plate 20B of the antenna apparatus according to the second embodiment of the present disclosure is set to a substantially half electric wavelength of the in-dielectric electric wavelength λd of the wireless signal (=3.2 mm) will be explained with reference to FIGS. 26 to 29.

Figure 22:
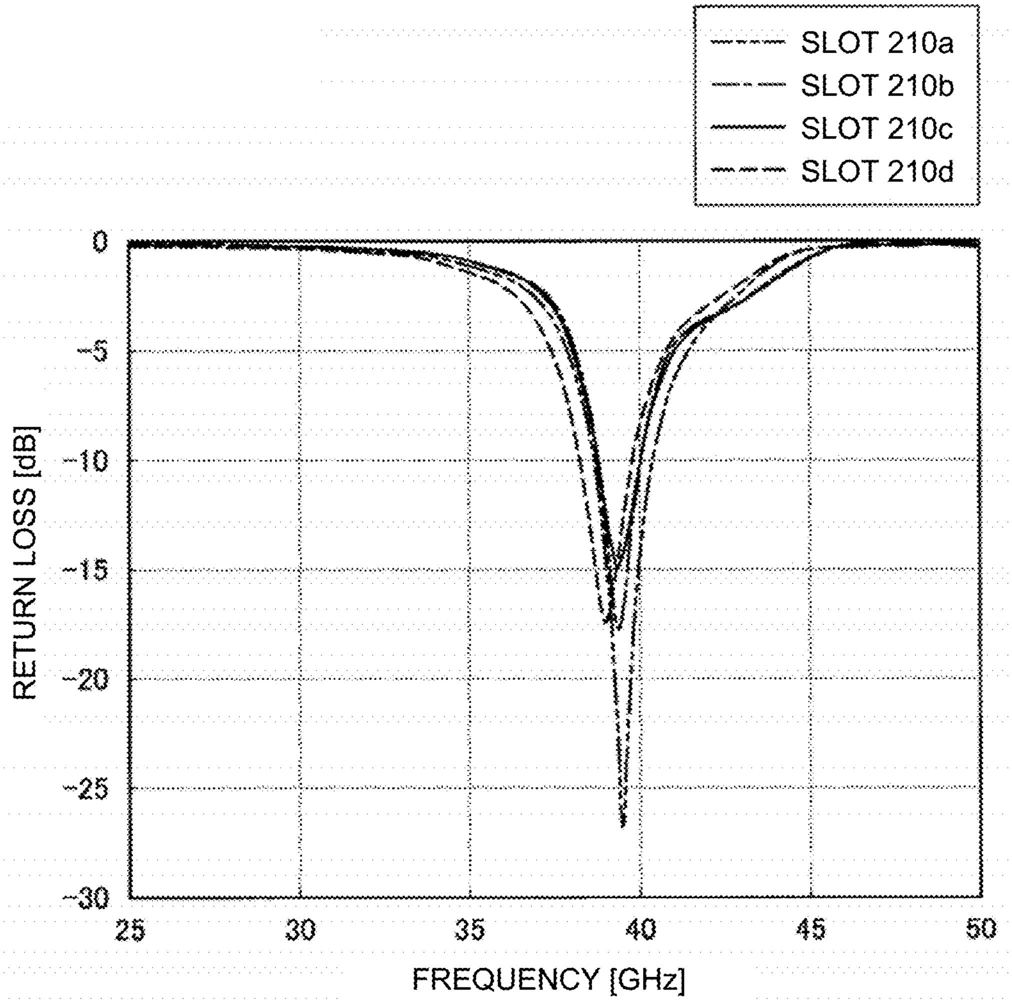
FIG. 22 is a schematic illustrating simulation results corresponding to the respective slots, indicating a relation between the frequency and the return loss, when the slot interval on the metal plate is set to substantially a ¼ electric wavelength of an in-dielectric electric wavelength in the antenna apparatus according to the embodiment.

FIG. 22 is a schematic illustrating simulation results corresponding to the respective slots, indicating a relation between the frequency and the return loss, when the slot interval on the metal plate 20B of the antenna apparatus according to the second embodiment of the present disclosure is set to substantially a ¼ electric wavelength of the in-dielectric electric wavelength λd. In the example illustrated in FIG. 22, the alternate long and two short dashes line indicates the reflection characteristics (return loss) in the slot 112*a*; the alternate long and short dash line indicates the reflection characteristics (return loss) in the slot 112*b*; the solid line indicates the reflection characteristics (return loss) in the slot 112*c*; and the dotted line indicates the reflection characteristics (return loss) in the slot 112*d*.

A return loss is a value representing the degree by which the wireless signal transmitted from the slot is reflected. Therefore, it can be considered that the antenna characteristics are better when the return loss is smaller. Referring to FIG. 22, for all of the four slots (slots 112*a* to 112*d*), the return loss is extremely low near 39 GHz (which corresponds to the frequency of the millimeter electric waves). In other words, in the example illustrated in FIG. 22, it can be seen that good antenna characteristics are achieved in the communication using the millimeter electric waves.

Figure 23:
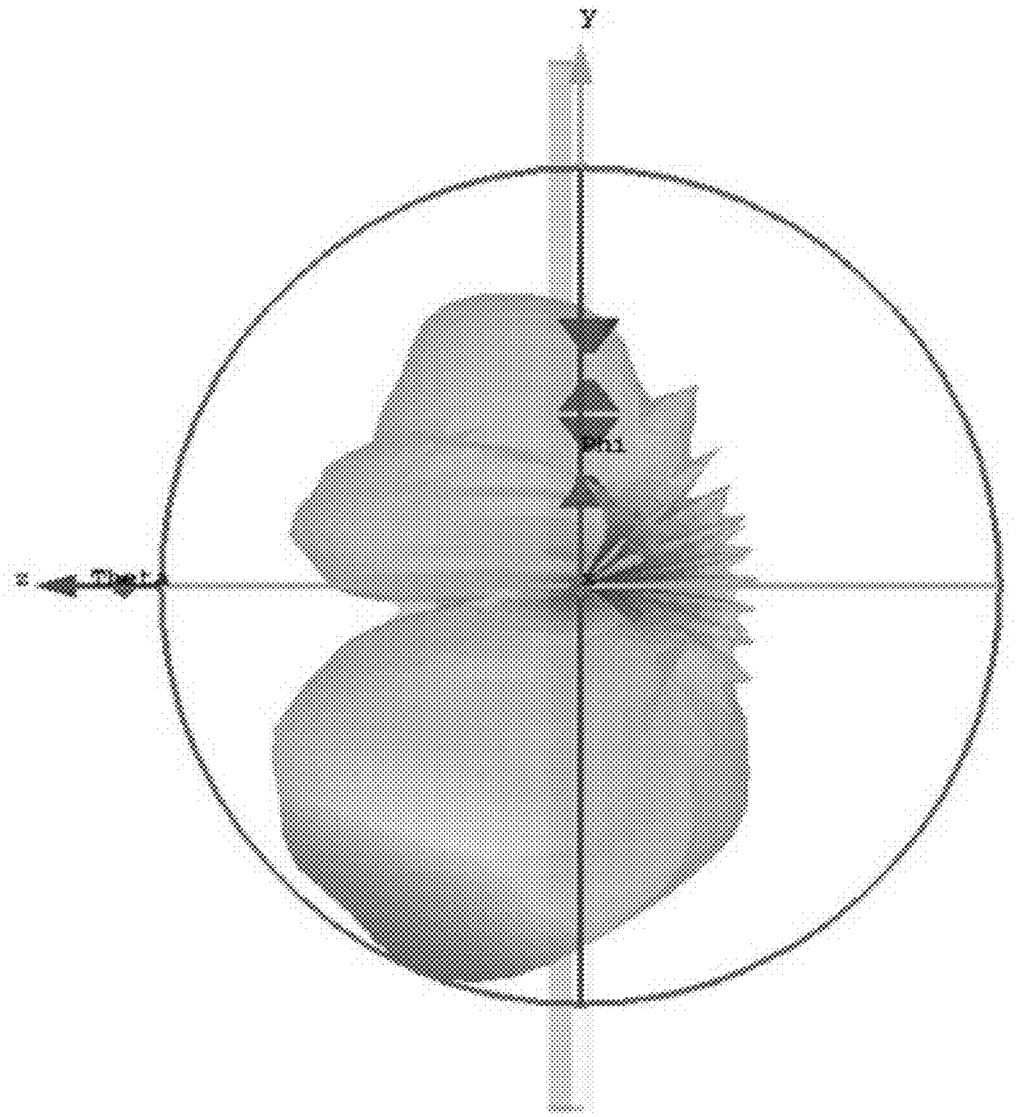
FIG. 23 is a schematic illustrating an example of a simulation result of the emission pattern when the slot interval on the metal plate is set to substantially a ¼ electric wavelength of the in-dielectric electric wavelength of the antenna apparatus according to the embodiment.
Figure 24:
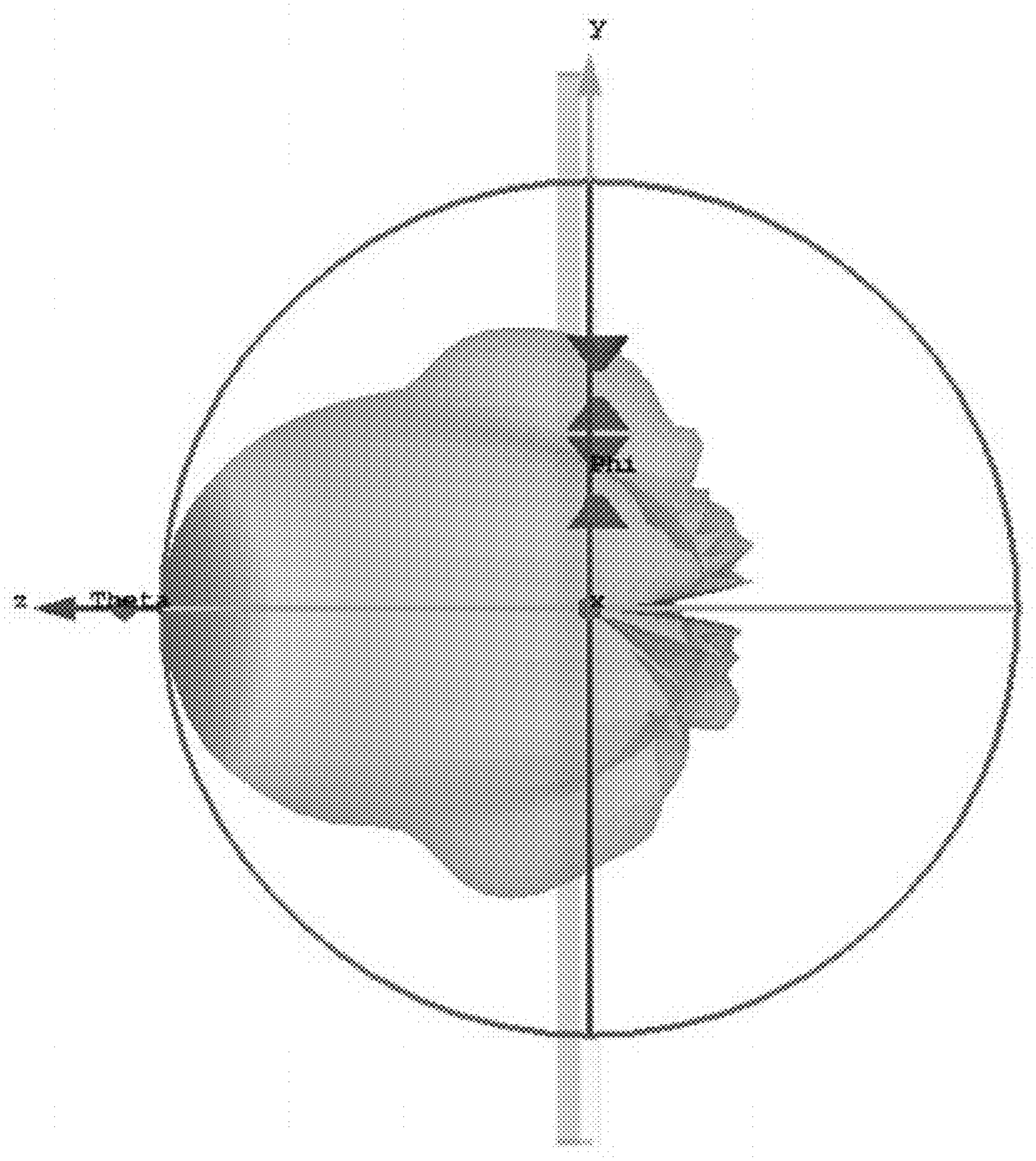
FIG. 24 is a schematic illustrating an example of a simulation result of the emission pattern when the slot interval on the metal plate is set to substantially a ¼ electric wavelength of the in-dielectric electric wavelength of the antenna apparatus according to the embodiment.
Figure 25:
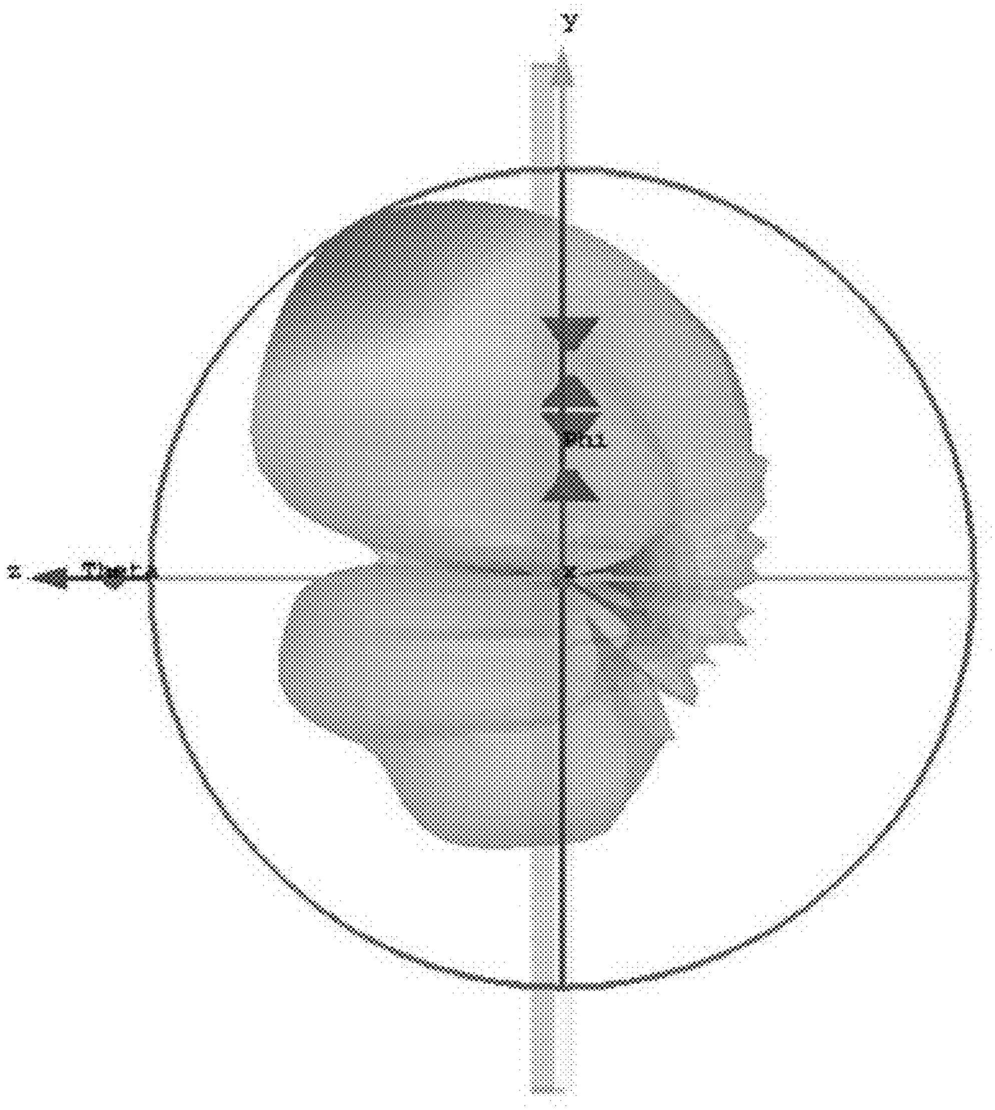
FIG. 25 is a schematic illustrating an example of a simulation result of the emission pattern when the slot interval on the metal plate is set to substantially a ¼ electric wavelength of the in-dielectric electric wavelength of the antenna apparatus according to the embodiment.

FIGS. 23 to 25 are schematics illustrating some example of simulation results of the emission pattern when the slot interval on the metal plate 20B of the antenna apparatus according to the second embodiment of the present disclosure is set to substantially a ¼ electric wavelength of the in-dielectric electric wavelength λd. In all of FIGS. 23 to 25, the frequencies of the wireless signals transmitted from the slots 112*a* to 112*d* are set to 39 GHz, and illustrated are simulation results when the antenna module 10B is viewed from a lateral side. The area with a higher gain is represented in a darker color.

Illustrated in FIGS. 23 to 25 are examples in which the directions of the beams from the slots 112*a* to 112*d* are controlled (beamforming is performed) by controlling the phase of the power supplied to the slots 112*a* to 112*d*. Specifically, FIG. 23 illustrates an example in which the angles of the phase of the supplied power are set to "90 degrees, 180 degrees, 270 degrees, 0 degrees", for the slots 112*a* to 112*d*, respectively; FIG. 24 illustrates an example in which the angles of the phase of the supplied power are set to "180 degrees, 0 degrees, 180 degrees, 0 degrees" for the slots 112*a* to 112*d*, respectively; and FIG. 25 illustrates an example in which the angles of the phase of the supplied power are set to "−90 degrees, −180 degrees, −270 degrees, 0 degrees" for the slots 112*a* to 112*d*, respectively.

Referring to the simulation results illustrated in FIGS. 23 to 25, it can be seen that the antenna apparatus according to the second embodiment of the present disclosure emits stronger electric waves frontwards than rearwards, regardless of which the beam directions are. This phenomenon is attributable to the shields 160 mounted on the antenna module 10B, suppressing the rearwards emissions of the electric waves from the antenna apparatus. Furthermore, the control of the beam directions is also achieved successfully. The gain peaks in the examples illustrated in FIGS. 23 to 25 are "10.3 dB", "6.2 dB", and "10.1 dB", respectively.

Figure 26:
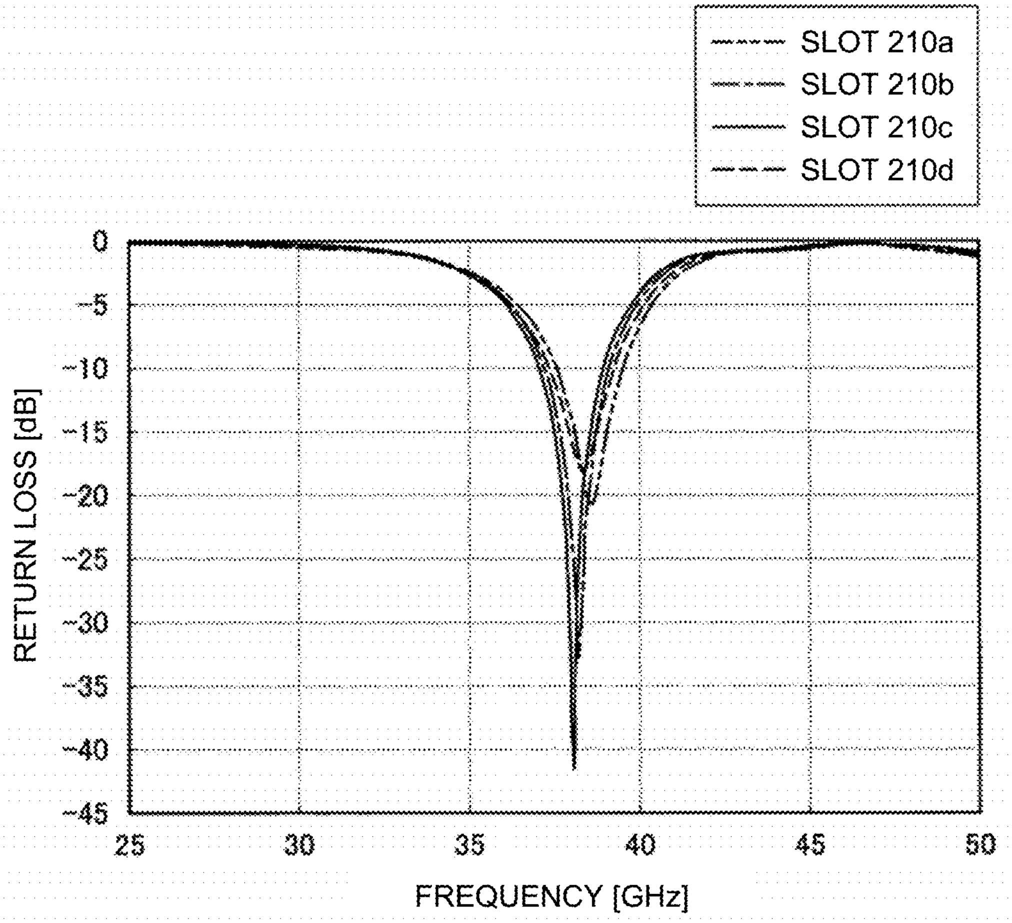
FIG. 26 is a schematic illustrating simulation results corresponding to the respective slots, indicating a relation between the frequency and the return loss, when the slot interval on the metal plate is set to substantially a ½ electric wavelength of the in-dielectric electric wavelength, in the antenna apparatus according to the embodiment.

FIG. 26 is a schematic illustrating simulation results corresponding to the respective slots, indicating a relation between the frequency and the return loss, when the slot interval on the metal plate 20B of the antenna apparatus according to the second embodiment of the present disclosure is set to substantially a ½ electric wavelength of the in-dielectric electric wavelength λd. In the example illustrated in FIG. 26, the correspondence between the types of lines used in the graphs and the slot is the same as that in the example illustrated in FIG. 22. Referring to FIG. 26, in the same manner as in the example illustrated in FIG. 22, for all of the four slots (slots 112*a* to 112*d*), the return loss is extremely low near 39 GHz (which corresponds to the frequency of the millimeter electric waves).

Figure 27:
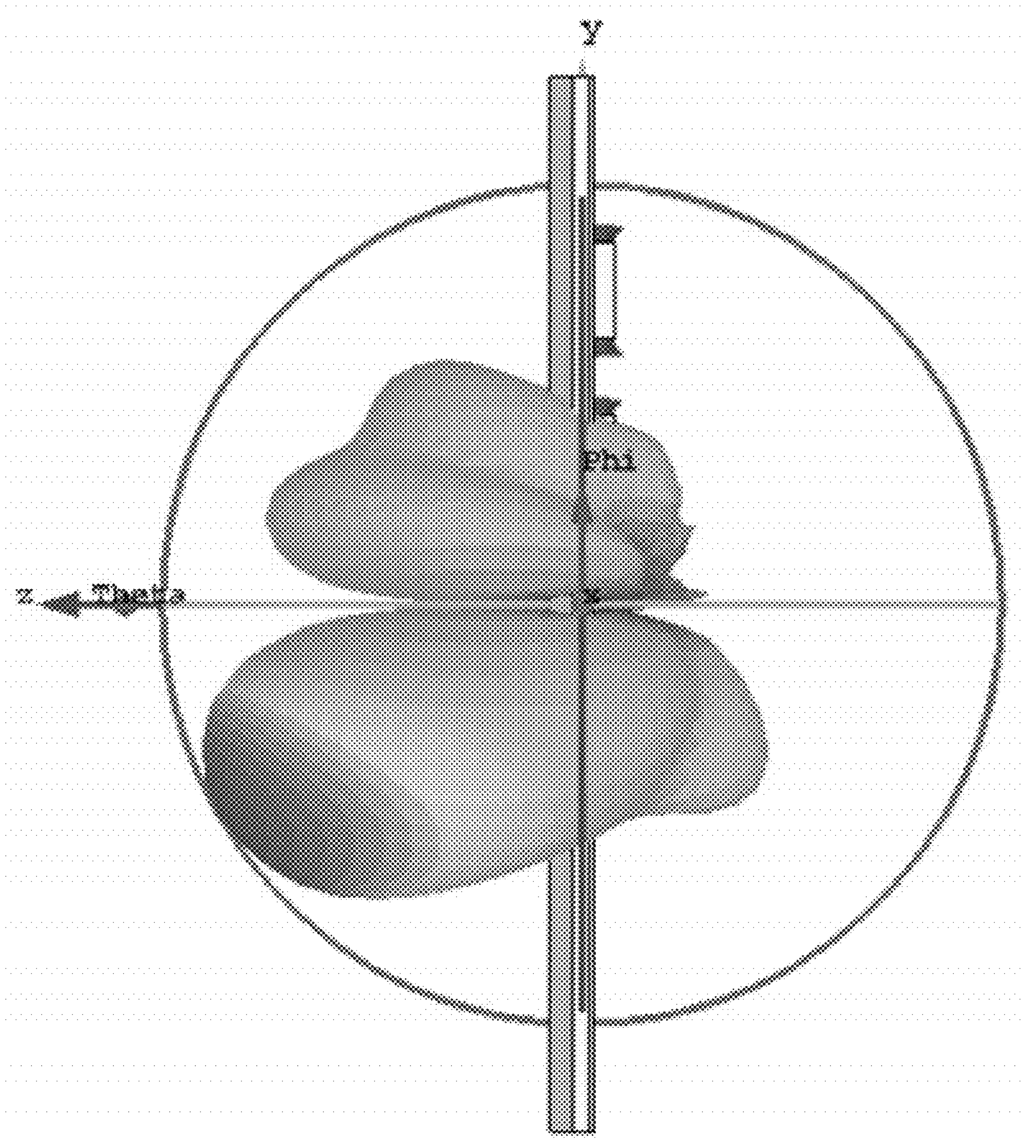
FIG. 27 is a schematic illustrating an example of a simulation result of the emission pattern when the slot interval on the metal plate is set to substantially a ½ electric wavelength of the in-dielectric electric wave, in the antenna apparatus according to the embodiment.
Figure 28:
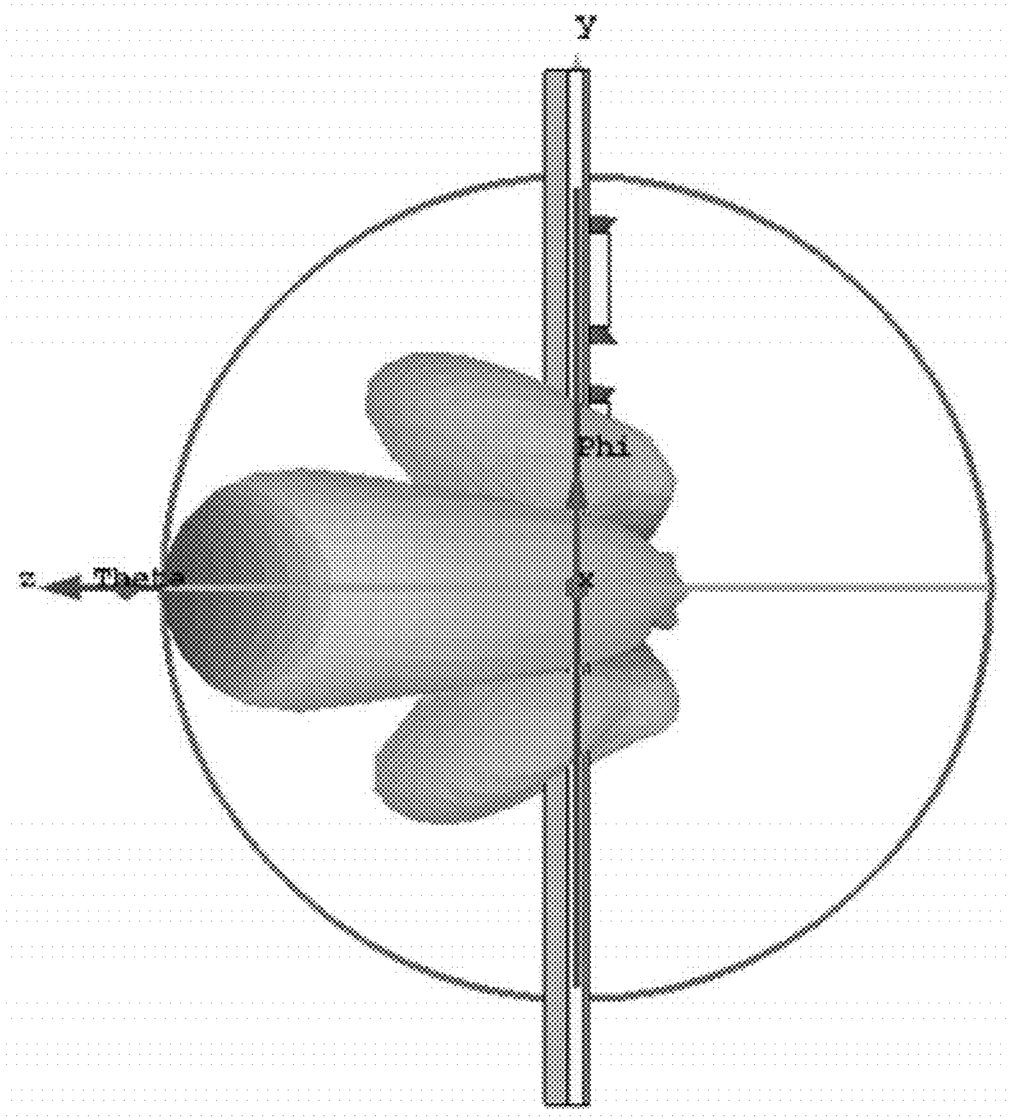
FIG. 28 is a schematic illustrating an example of a simulation result of the emission pattern when the slot interval on the metal plate is set to substantially a ½ electric wavelength of the in-dielectric electric wave, in the antenna apparatus according to the embodiment.
Figure 29:
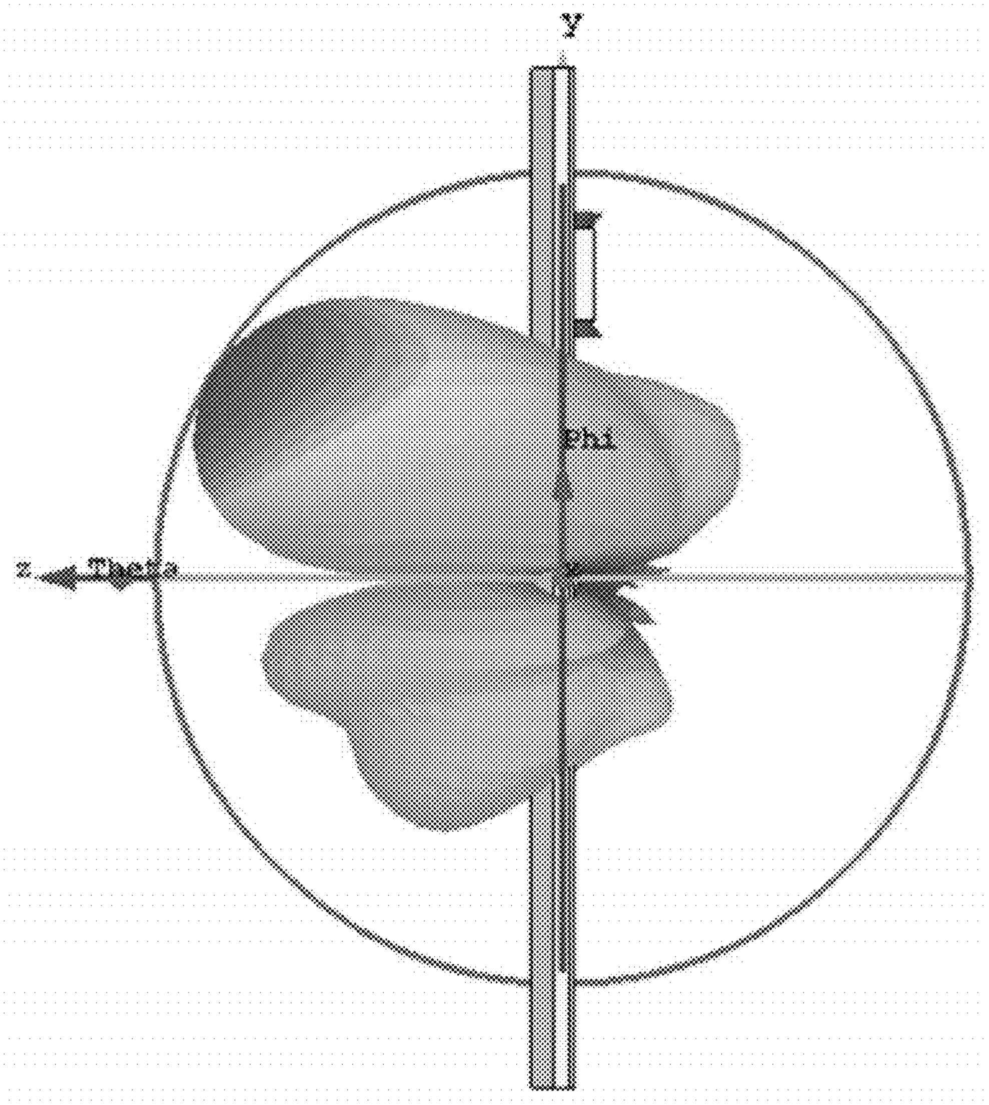
FIG. 29 is a schematic illustrating an example of a simulation result of the emission pattern when the slot interval on the metal plate is set to substantially a ½ electric wavelength of the in-dielectric electric wave, in the antenna apparatus according to the embodiment.

FIGS. 27 to 29 are schematics illustrating some examples of simulation results of the emission pattern when the slot interval on the metal plate 20B of the antenna apparatus according to the second embodiment of the present disclosure is set to substantially a ½ electric wavelength of the in-dielectric electric wavelength λd. The example illustrated in FIGS. 27 to 29 are the same as the examples illustrated in FIGS. 23 to 25, except that the slot interval in the metal plate 20B is set to substantially a ½ electric wavelength of the in-dielectric electric wavelength λd.

Referring to the simulation results illustrated in FIGS. 27 to 29, it can be seen that the antenna apparatus according to the second embodiment of the present disclosure emits stronger electric waves frontwards than rearwards, compared with the simulation results illustrated in FIGS. 23 to 25. With this configuration, it can be seen that setting of the slot interval in the metal plate 20B to the substantially a ½ electric wavelength of the in-dielectric electric wavelength λd contributes more to the improvement of the antenna characteristics. The gain peaks in the examples illustrated in FIGS. 23 to 25 are "10.0 dB", "11.1 dB", "10.0 dB", respectively.

Discussions about the antenna apparatus according to the second embodiment of the present disclosure have been provided above with reference to FIGS. 22 to 29.

3. Third Embodiment

A third embodiment of the present disclosure will now be explained. The 3rd Generation Partnership Project (3GPP) defines a method for measuring wireless performance (over-the-air (OTA) measurement method). For the OTA measurement method, the equivalent isotropic sensitivity (EIS) is defined as a measurement method for a receiver apparatus. The EIS is defined by two polarizations that are orthogonal to each other. Therefore, in the third embodiment of the present disclosure, a technology that can support such a measurement method will now be explained.

<3.1. Structure of Antenna Apparatus>

Figure 30:
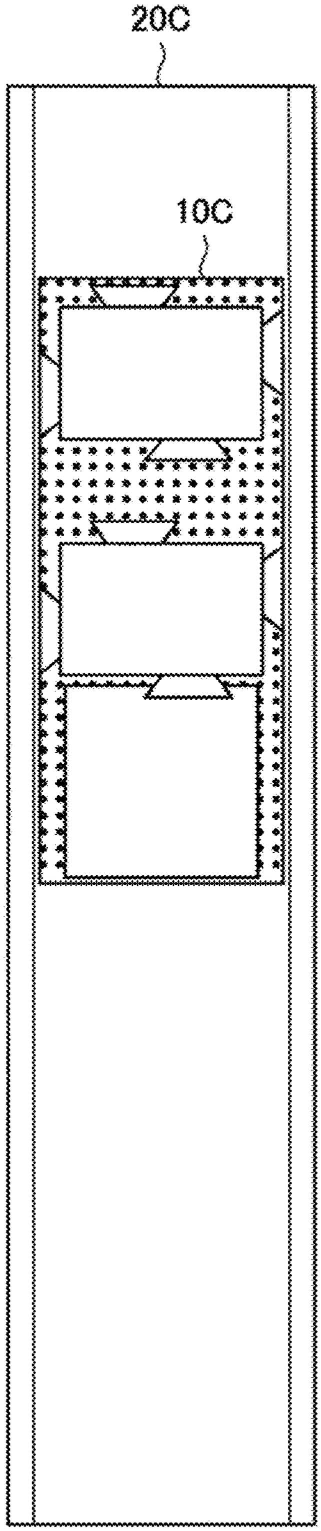
FIG. 30 is a schematic of an antenna apparatus according to a third embodiment of the present disclosure viewed from the rear side.
Figure 31:
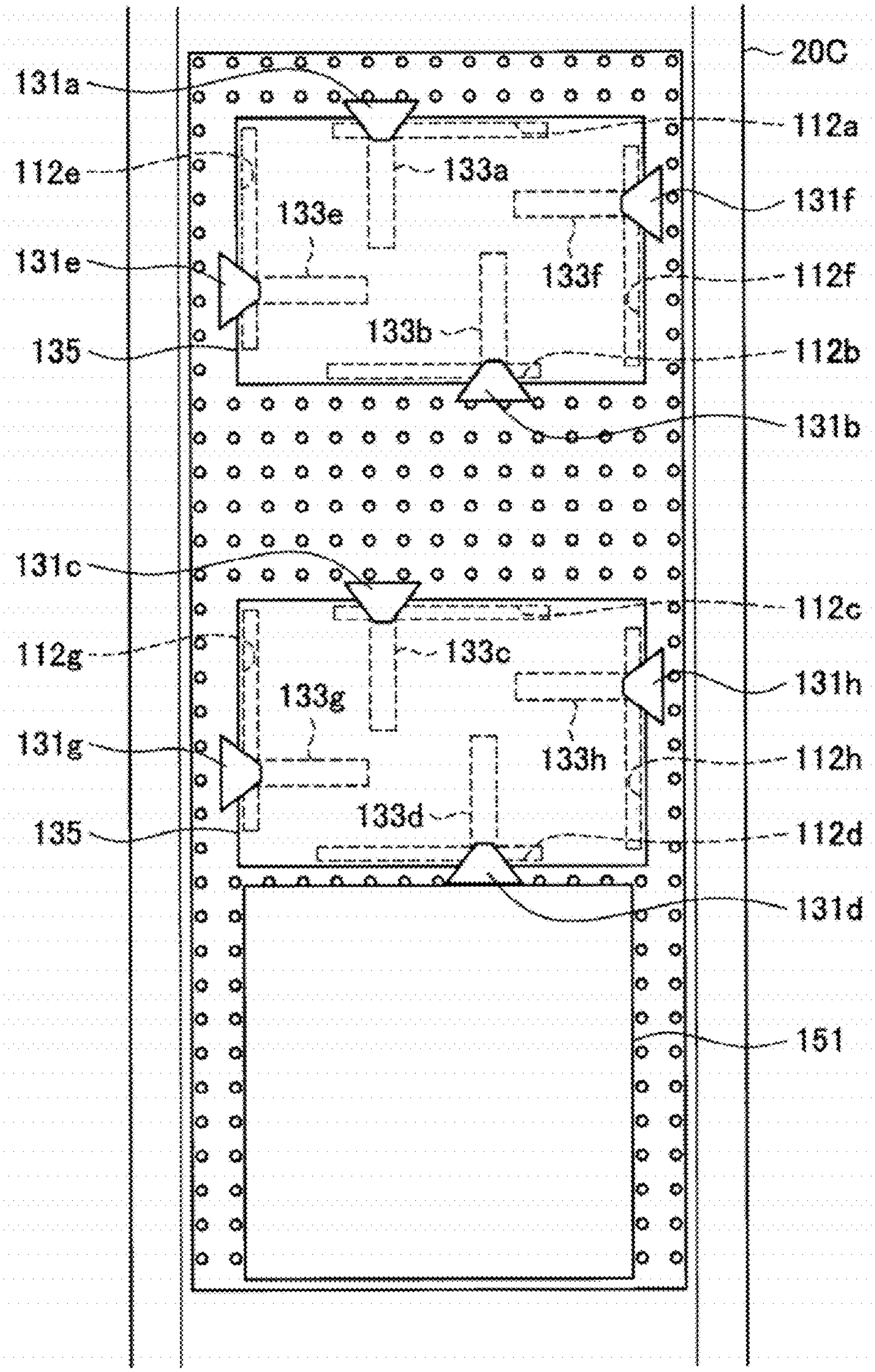
FIG. 31 is a partial enlarged view of FIG. 30.

An exemplary structure of the antenna apparatus according to the third embodiment of the present disclosure will now be explained with reference to FIGS. 30 to 32. FIG. 30 is a schematic of the antenna apparatus according to the third embodiment of the present disclosure, viewed from the rear side. FIG. 31 is a partial enlarged view of FIG. 30. As illustrated in FIGS. 30 and 31, the antenna apparatus according to the third embodiment of the present disclosure includes the antenna module 10C and a metal plate 20C. In the same manner as in the first embodiment of the present disclosure, the antenna module 10C is mounted on the inner side of the metal plate 20C.

As illustrated in FIG. 31, in order to support the measurement method defined by the two polarizations that are orthogonal to each other, the antenna module 10C according to the third embodiment of the present disclosure is different from the second embodiment of the present disclosure in that not only the slots (slots 112*a* to 112*d*) but also another plurality of slots (slots 112$e$ to 112$h$) having their polarization directions orthogonal to the former slots are provided to the front-side layer. Mainly assumed in the third embodiment of the present disclosure is a configuration in which the number of the slots is eight in total. However, there is no limitation to the number of slots, as long as the number is in a plurality.

It is preferable for these slots (slots 112$e$ to 112$h$), too, to be arranged in substantially matching directions. Because the slots (slots 112$a$ to 112$d$) are arranged in substantially matching directions in the horizontal direction, the slots (slots 112$e$ to 112$h$) are arranged, by referring to FIG. 31, in substantially matching directions in the vertical direction (vertical direction), so that the slots (slots 112$e$ to 112$h$) are orthogonal to the slots (slots 112$a$ to 112$d$). However, the directions of the slots (slots 112$e$ to 112$h$) are not limited to the vertical direction.

As illustrated in FIG. 31, the feed point 131 and the strip line (second feed element) 133 are also provided to each of the slots (slots 112$e$ to 112$h$). Specifically, the feed point 131$e$ and the strip line 133$e$ are provided for the slot 112$e$; a feed point 131$f$ and a strip line 133$f$ are provided for the slot 112$f$; a feed point 131g and a strip line 133g are provided for the slot 112g; and a feed point 131$h$ and a strip line 133$h$ are provided for the slot 112$h$.

Furthermore, as illustrated in FIG. 31, the inner layer of the antenna module 10C according to the third embodiment of the present disclosure is different from the inner layer according to the second embodiment of the present disclosure in that the one GND cutout 135 is provided for the four strip lines (second feed elements). Specifically, one GND cutout 135 is provided for the strip lines 133$a$, 133$b$, 133$e$, 133$f$, and one GND cutout 135 is provided for the strip lines 133$c$, 133$d$, 133g, 133$h$. The four GND cutouts 135 are provided to the respective holes on the inner layer. The number of the GND cutouts 135 is, however, not limited to any particular number.

The feed points 131$a$ to 131$d$ and the strip lines 133$a$ to 133$d$ function in the same manner as those in the second embodiment.

When power supply from the RFIC 151 is received, the feed point 131$e$ communicates the power to the strip line 133$e$ via the inner layer line. The strip line 133$e$ is provided on a surface on the front side of the corresponding GND cutout 135, and supplies, when the power is communicated from the feed point 131$e$ via the inner layer line, the power to the slot 112$e$ based on the power.

When power supply from the RFIC 151 is received, the feed point 131$f$ communicates the power to the strip line 133$f$ via the inner layer line. The strip line 133$f$ is provided on a surface on the front side of the corresponding GND cutout 135, and supplies, when the power is communicated from the feed point 131$f$ via the inner layer line, the power to the slot 112$f$ based on the power.

When power supply from the RFIC 151 is received, the feed point 131$g$ communicates the power to the strip line 133$g$ via the inner layer line. The strip line 133$g$ is provided on a surface on the front side of the corresponding GND cutout 135, and supplies, when the power is communicated from the feed point 131$g$ via the inner layer line, the power to the slot 112$g$ based on the power.

When power supply from the RFIC 151 is received, the feed point 131$h$ communicates the power to the strip line 133$h$ via the inner layer line. The strip line 133$h$ is provided on a surface on the front side of the corresponding GND cutout 135, and supplies, when the power is communicated from the feed point 131$h$ via the inner layer line, the power to the slot 112$h$ based on the power.

Figure 32:
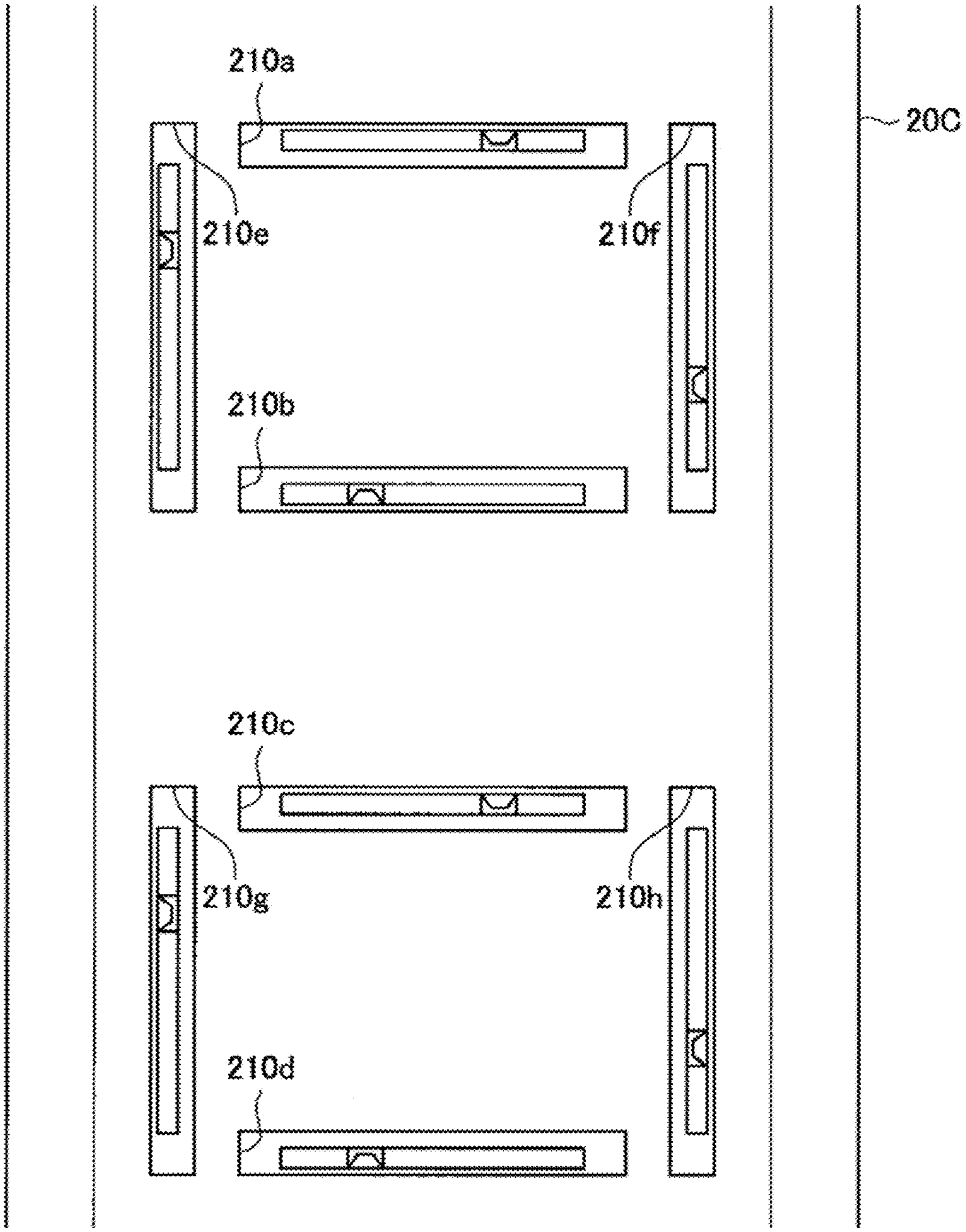
FIG. 32 is a schematic of the antenna apparatus according to the third embodiment of the present disclosure viewed from the front side.

FIG. 32 is a schematic of the antenna apparatus according to the third embodiment of the present disclosure, viewed from the front side. In the same manner as in the first embodiment of the present disclosure, the metal plate 20C may make up at least a part of a predetermined housing. The metal plate 20C is provided not only with the slots 210$a$ to 210$d$ but also with the slots 210$e$ to 210$h$. The slots 210$a$ to 210$d$ are the same as those in the second embodiment of the present disclosure.

The slot 210$e$ serves as a propagation channel for the electric waves emitted (second wireless signals transmitted) from the slot 112$e$ of the antenna module 10C. In the same manner, the slot 210$f$ serves as a propagation channel for the electric waves emitted (second wireless signals transmitted) from the slot 112$f$ of the antenna module 10C. The slot 210g serves as a propagation channel for the electric waves emitted (second wireless signals transmitted) from the slot 112g of the antenna module 10C. The slot 210$h$ serves as a propagation channel for the electric waves emitted (second wireless signals transmitted) from the slot 112$h$ of the antenna module 10C.

More specifically, it is preferable to set the longitudinal direction of the slot 210$e$ in a manner substantially matching the polarization direction of the power emitted from the slot 112$e$ in the antenna module 10C. As mentioned earlier, it is preferable to set the longitudinal direction of the slot 112$e$ of the antenna module 10C in a manner substantially matching the polarization direction of the second wireless signals. Therefore, it is preferable to match the longitudinal direction of the slot 210$e$ with the longitudinal direction of the slot 112$e$ of the antenna module 10C (the vertical direction in the example illustrated in FIG. 32).

In the same manner, it is preferable to match the longitudinal direction of the slot 210$f$, the polarization direction of the power emitted from the slot 112$f$, and the longitudinal direction of the slot 112$f$. It is also preferable to match the longitudinal direction of the slot 210$g$ and the polarization direction of the power emitted from the slot 112$g$, and the longitudinal direction of the slot 112$g$. It is also preferable to match the longitudinal direction of the slot 210$h$, the polarization direction of the power emitted from the slot 112$h$, and the longitudinal direction of the slot 112$h$.

It is preferred that groups of slots, the groups having different longitudinal directions from each other, not be separated from each other in a predetermined direction. Specifically, it is preferred that a slot having its longitudinal direction in the horizontal direction be positioned between the slots having their longitudinal directions in the vertical direction. For example, referring to FIG. 32, the slot 210$a$ and the slot 210$b$ are positioned between the slot 210$e$ and the slot 210$f$, and the slot 210$c$ and the slot 210$d$ are positioned between the slot 210g and the slot 210$h$. With this configuration, it is possible to achieve a space saving in the antenna apparatus.

As explained above, with the antenna apparatus according to the third embodiment of the present disclosure, the same effects as those achieved by the antenna apparatus according to the second embodiment of the present disclosure are achieved. Furthermore, the antenna apparatus according to the third embodiment of the present disclosure, a plurality of slots having their longitudinal directions orthogonal to one another are provided to the metal plate 20C. With this configuration, it becomes possible to support the measurement method defined by the two polarizations that are orthogonal to each other.

An exemplary structure of the antenna apparatus according to the third embodiment of the present disclosure has been explained above with reference to FIGS. 30 to 32.

<3.2. Discussions about Antenna Apparatus>

In the explanation hereunder, discussions about the antenna apparatus according to the third embodiment of the present disclosure will be provided with reference to FIGS. 33 to 39.

Figure 33:
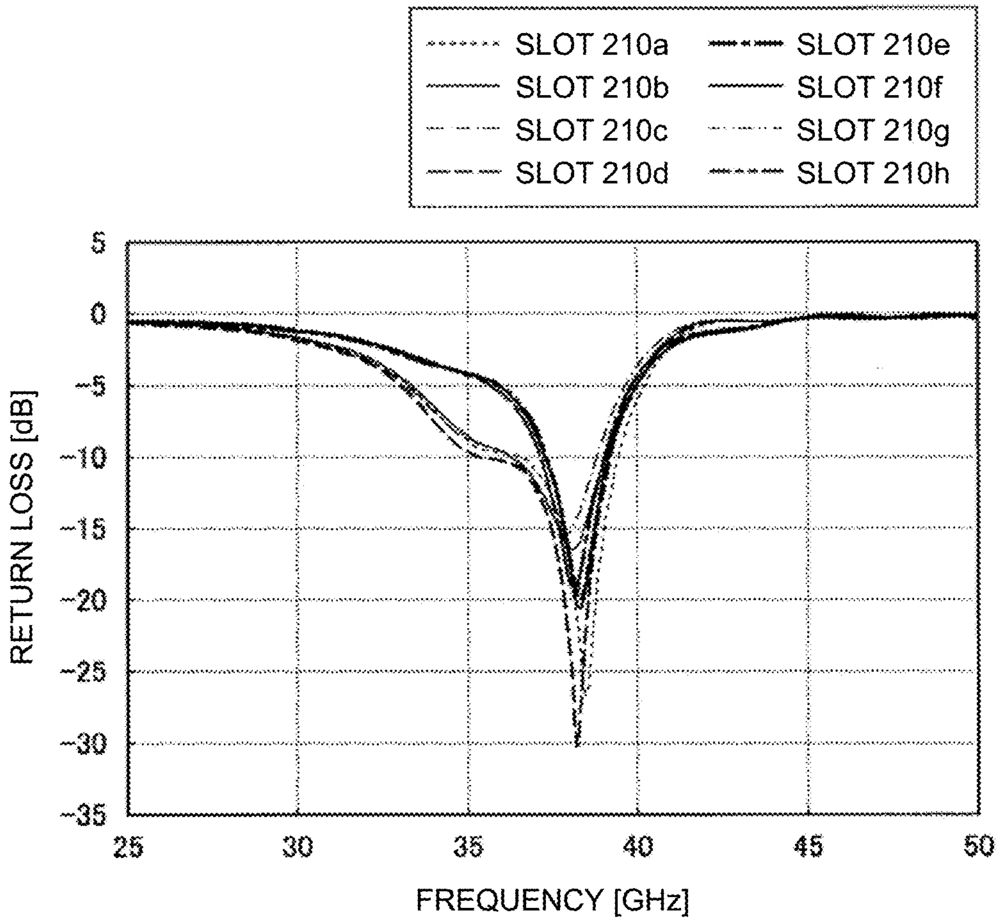
FIG. 33 is a schematic illustrating simulation results corresponding to the respective slots, indicating a relation between the frequency and the return loss, in the antenna apparatus according to the third embodiment of the present disclosure.

FIG. 33 is a schematic illustrating a simulation result of a relation between the frequency and the return loss, corresponding to each slot in the antenna apparatus according to the third embodiment of the present disclosure. In the example illustrated in FIG. 33, by referring to FIG. 33, for all of the eight slots (slots 112a to 112h), the return loss is extremely low near 39 GHz (which corresponds to the frequency of the millimeter electric waves). In other words, in the example illustrated in FIG. 33, it can be seen that good antenna characteristics are achieved in the communication using the millimeter electric waves.

Figure 34:
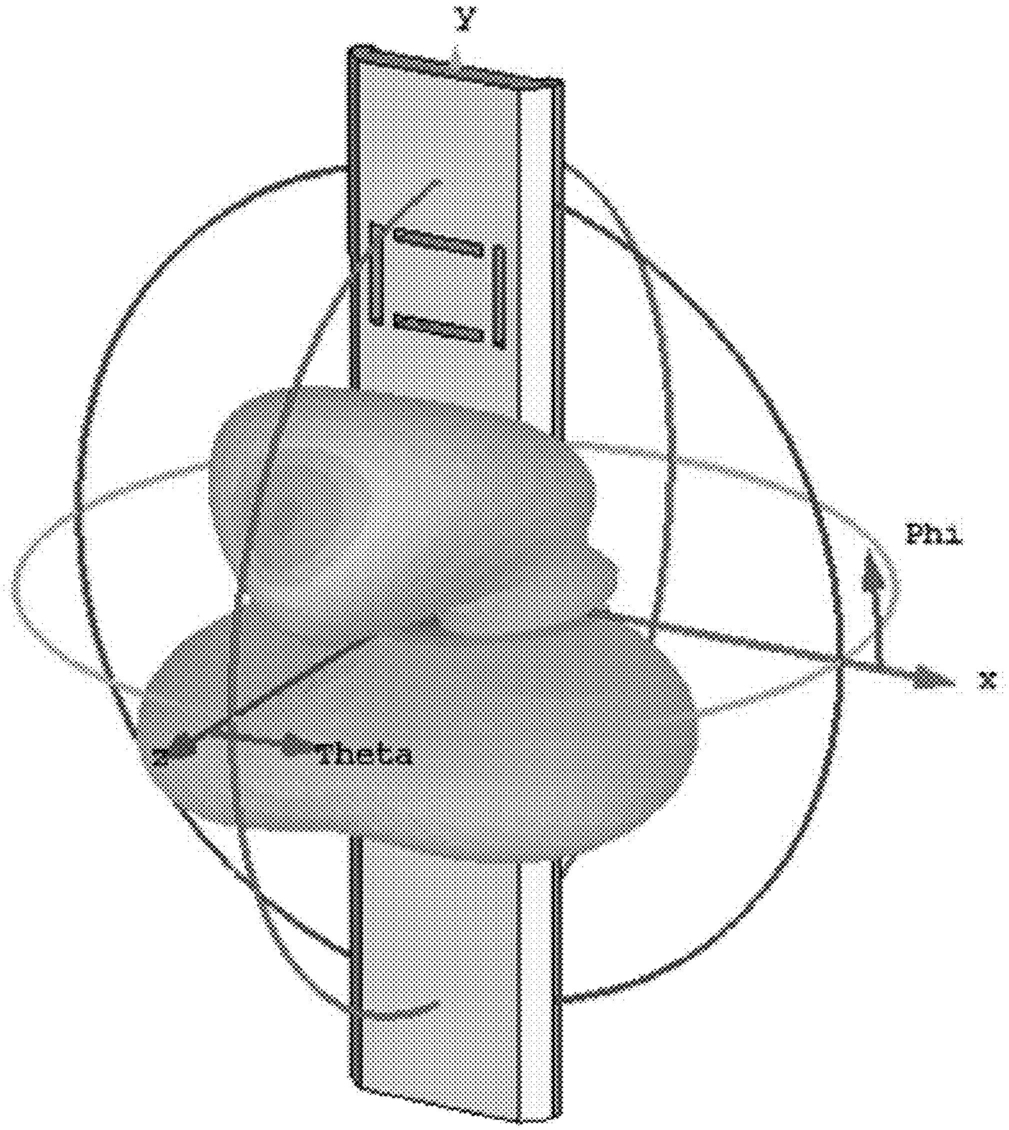
FIG. 34 is a schematic illustrating an example of a simulation result of the emission pattern of a horizontally polarized wave, in the antenna apparatus according to the embodiment.
Figure 35:
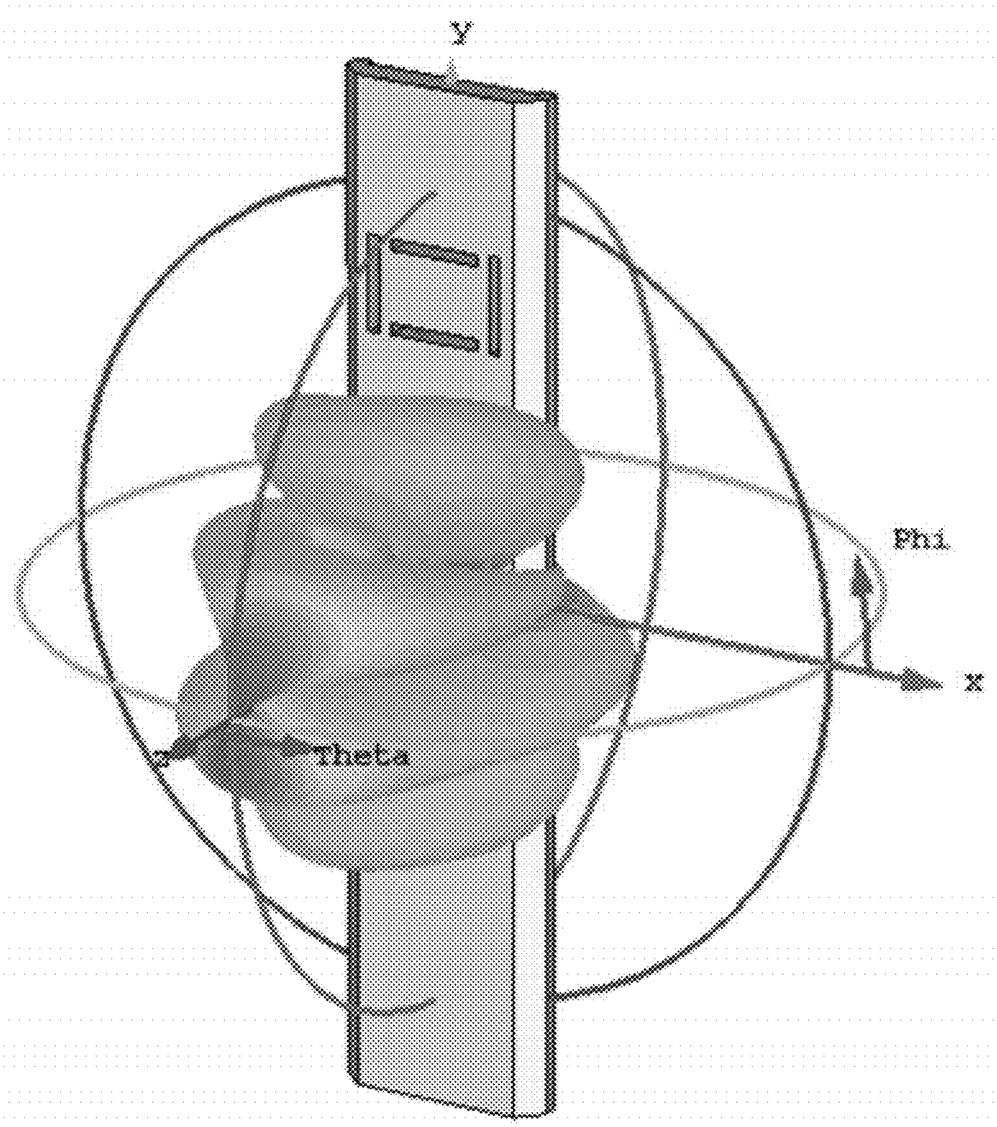
FIG. 35 is a schematic illustrating an example of a simulation result of the emission pattern of the horizontally polarized wave, in the antenna apparatus according to the embodiment.
Figure 36:
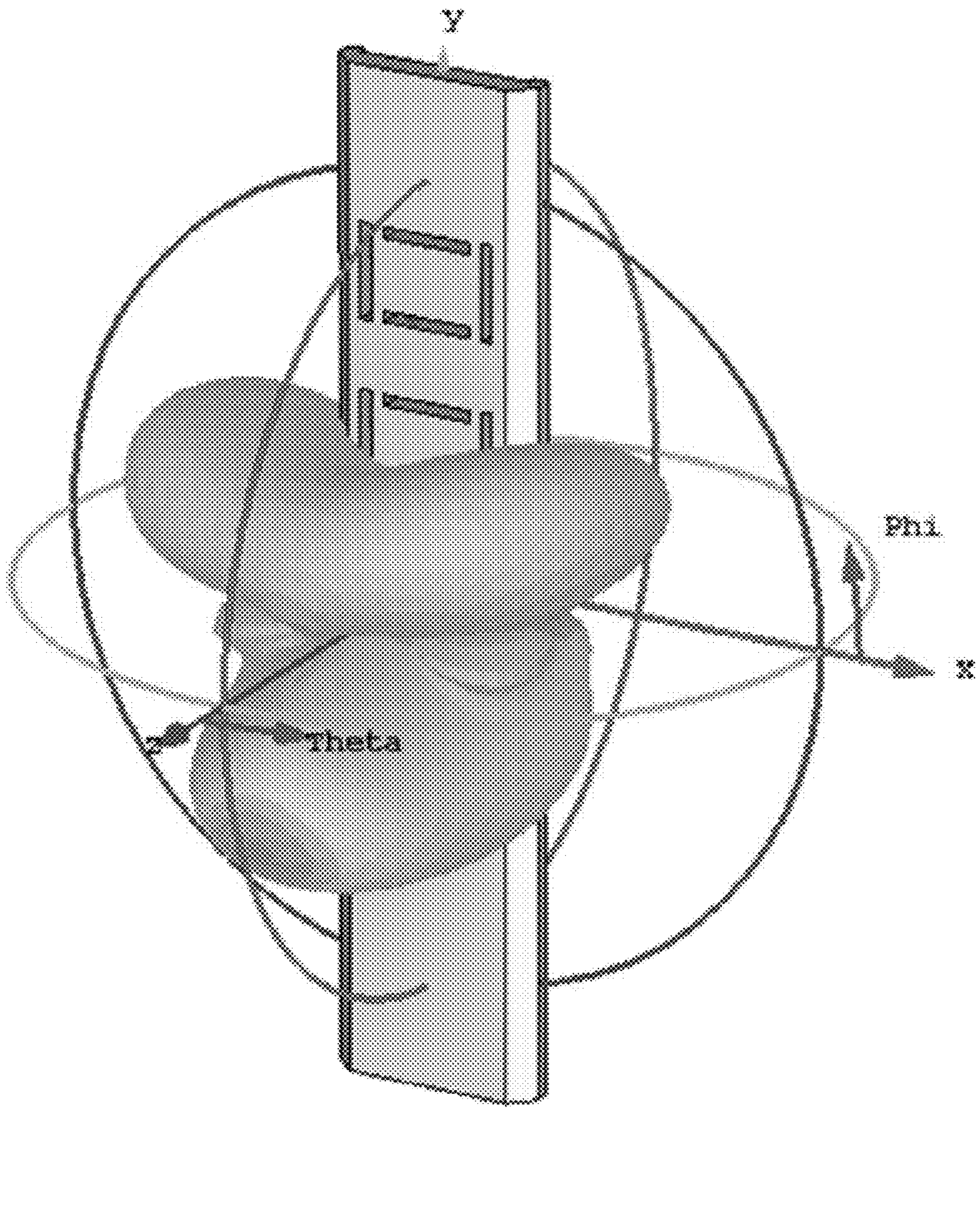
FIG. 36 is a schematic illustrating an example of a simulation result of the emission pattern of the horizontally polarized wave, in the antenna apparatus according to the embodiment.

FIGS. 34 to 36 are schematics illustrating some examples of simulation results of the emission pattern of a horizontally polarized wave, in the antenna apparatus according to the third embodiment of the present disclosure. In all of FIGS. 34 to 36, the frequency of the wireless signal transmitted from the slots 112a to 112d is set to 39 GHz, and illustrated is a simulation result when the antenna module 10C is viewed from the diagonally front side. Furthermore, the area with a higher gain is represented in a darker color.

Furthermore, illustrated in FIGS. 34 to 36 is an example in which the directions of the beams from the slots 112a to 112d are controlled (beamforming is performed) by controlling the phase of the power supplied to the slots 112a to 112d. Specifically, FIG. 34 illustrates an example in which the angles of the phase of the supplied power are set to “270 degrees, 180 degrees, 90 degrees, 0 degrees” for the slots 112a to 112d, respectively. FIG. 35 illustrates an example in which the angles of the phase of the supplied power are set to “180 degrees, 0 degrees, 180 degrees, 0 degrees” for the slots 112a to 112d, respectively. FIG. 36 illustrates an example in which the angles of the phase of the supplied power are set to “90 degrees, 180 degrees, 270 degrees, 0 degrees”, for the slots 112a to 112d, respectively.

Referring to the simulation results illustrated in FIGS. 34 to 36, in the same manner as in the second embodiment of the present disclosure, it can be seen that the antenna apparatus according to the third embodiment of the present disclosure emits stronger electric waves frontwards than rearwards, whatever the directions of the beams emitted from the slots 112a to 112d. The control of the beam directions is also achieved successfully. The gain peaks in the examples illustrated in FIGS. 34 to 36 are “7.2 dB”, “10.8 dB”, “7.3 dB”, respectively.

Figure 37:
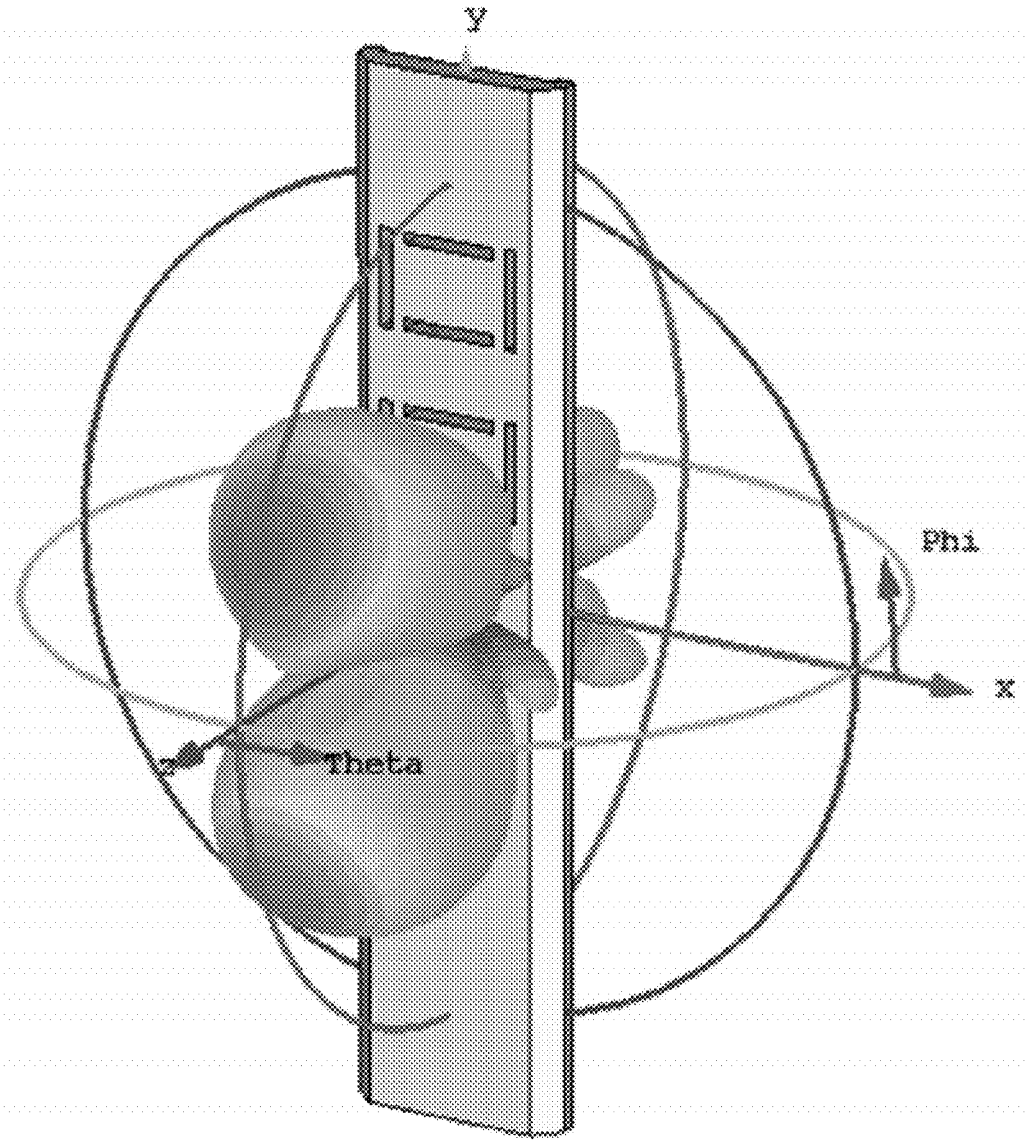
FIG. 37 is a schematic illustrating an example of a simulation result of the emission pattern of the vertically polarized wave, in the antenna apparatus according to the embodiment.
Figure 38:
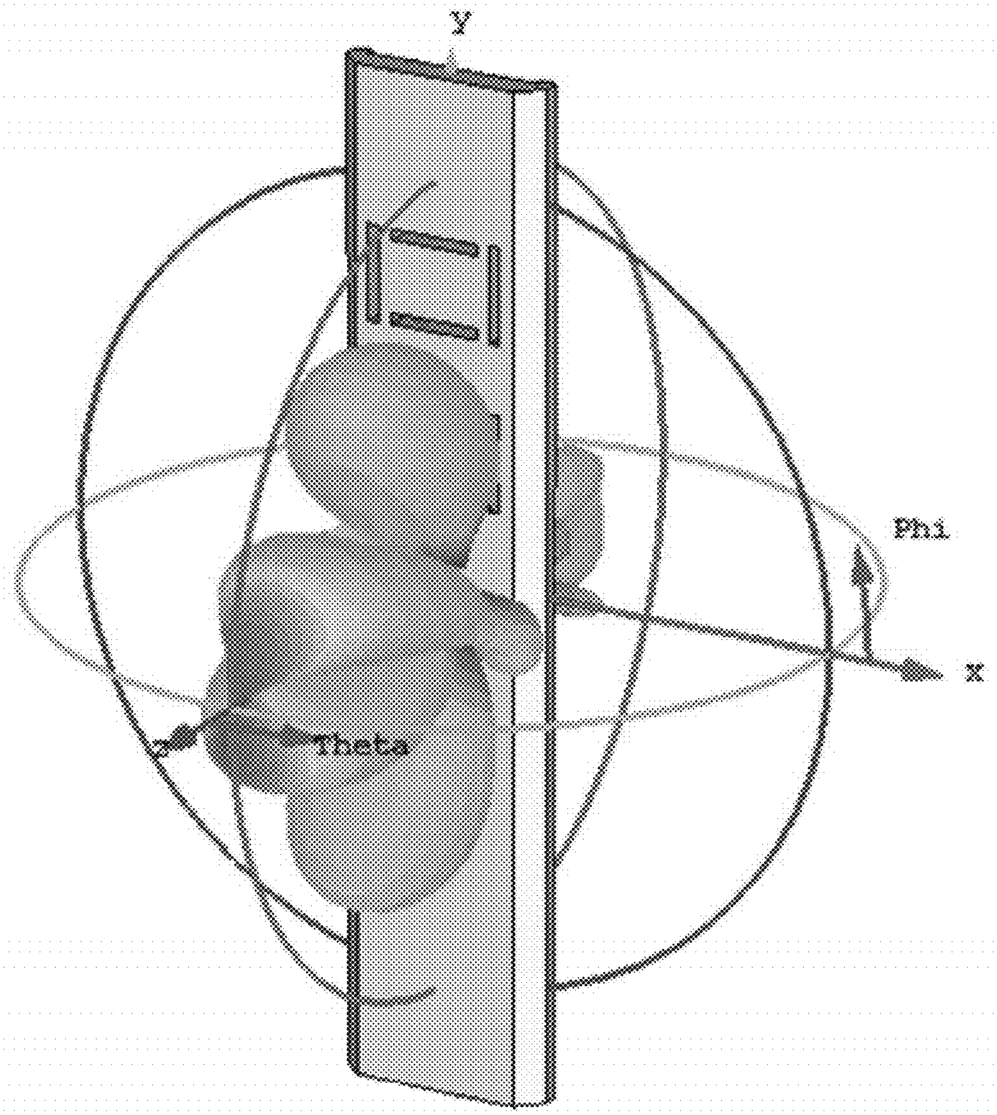
FIG. 38 is a schematic illustrating an example of a simulation result of the emission pattern of the vertically polarized wave, in the antenna apparatus according to the embodiment.
Figure 39:
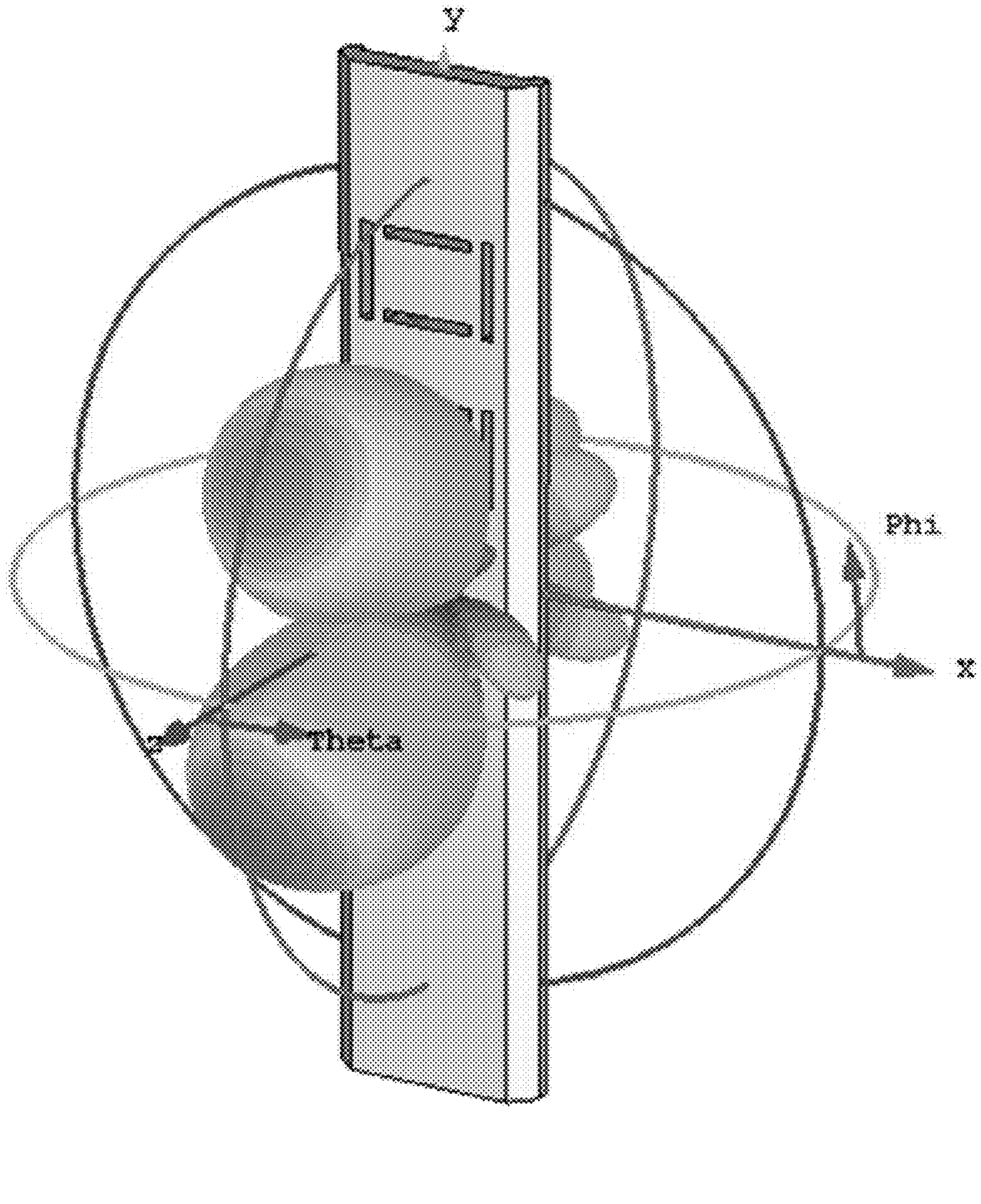
FIG. 39 is a schematic illustrating an example of a simulation result of the emission pattern of the vertically polarized wave, in the antenna apparatus according to the embodiment.

FIGS. 37 to 39 are schematics illustrating some examples of simulation results of the emission pattern of a vertically polarized wave, in the antenna apparatus according to the third embodiment of the present disclosure. Illustrated in FIGS. 37 to 39 are examples in which directions of the beams from the slots 112e to 112h are controlled (beamforming is performed) by controlling the phase of the power supplied to the slots 112e to 112h. Specifically, FIG. 37 illustrates an example in which the angles of the phase of the supplied power are set to “202.5 degrees, 22.5 degrees, 0 degrees, 180 degrees” for the slots 112e to 112h, respectively; FIG. 38 illustrates an example in which the angles of the phase of the supplied power are set to “0 degrees, 180 degrees, 0 degrees, 180 degrees” for the slots 112e to 112h, respectively; and FIG. 39 illustrates an example in which the angles of the phase of the supplied power are set to “157.5 degrees, 337.5 degrees, 0 degrees, 180 degrees” for the slots 112e to 112h, respectively.

Referring to the simulation results illustrated in FIGS. 37 to 39, it can be seen that the antenna apparatus according to the third embodiment of the present disclosure emits stronger electric waves frontwards than rearwards, whatever the directions of the beams emitted from the slots 112e to 112h, in the same manner as the simulation results illustrated in FIGS. 34 to 36. The control of the beam directions is also achieved successfully. The gain peaks in the examples illustrated in FIGS. 37 to 39 are “9.4 dB”, “10.7 dB”, “9.4 dB”, respectively.

Discussions about the antenna apparatus according to the third embodiment of the present disclosure have been made with reference to FIGS. 33 to 39.

<3.3. Modification>

Figure 40:
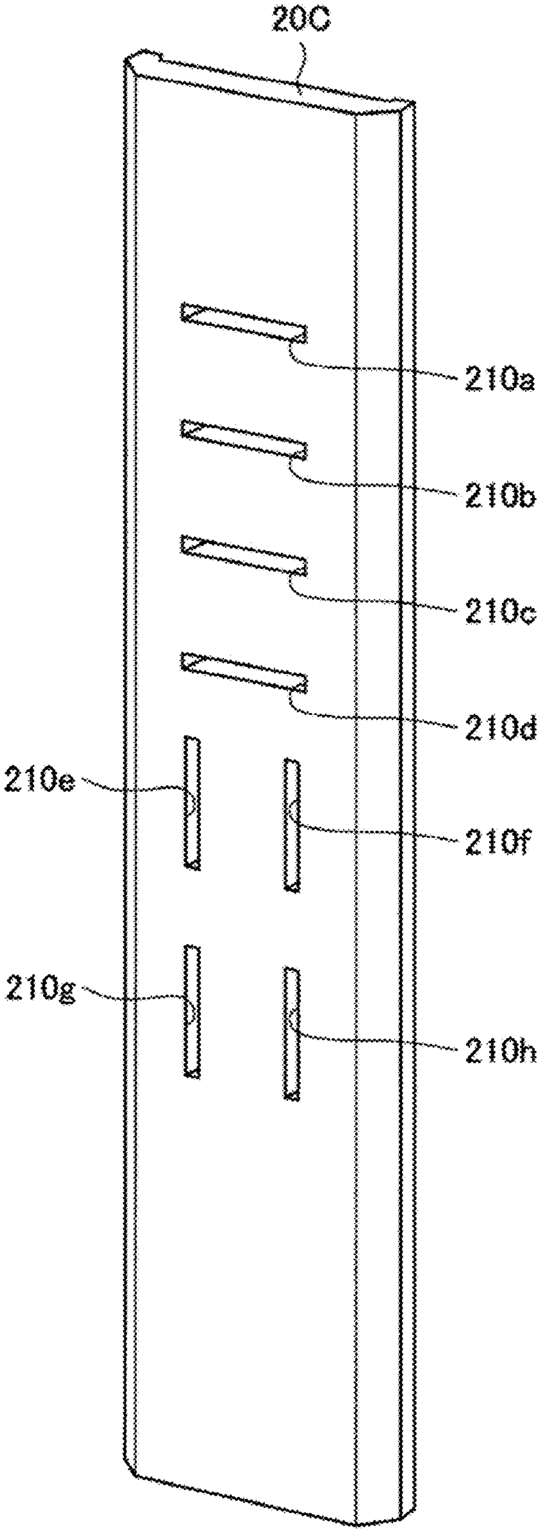
FIG. 40 is a schematic for explaining a modification of the antenna apparatus according to the embodiment.

In the explanation hereunder, the antenna apparatus according to a modification of the third embodiment of the present disclosure will now be explained with reference to FIG. 40. FIG. 40 is a schematic for explaining the antenna apparatus according to the modification of the third embodiment of the present disclosure.

Explained above is an example in which the groups of slots, the groups having different longitudinal directions from each other, are not separated from each other in a predetermined direction. Specifically, explained is an example in which the slots having their longitudinal directions in the horizontal direction are positioned between the slots having their longitudinal directions in the vertical direction. With this configuration, it is possible to achieve a space saving in the antenna apparatus. However, the groups of slots, the groups having different longitudinal directions from each other, may be separated from each other in a predetermined direction. Specifically, it is possible for a slot having its longitudinal direction in the horizontal direction not to be positioned between a plurality of slots having their longitudinal directions in the vertical direction.

For example, referring to FIG. 40, the slot 210a and the slot 210b are positioned away from the area between the slot 210e and the slot 210f. Furthermore, the slot 210c and the slot 210d are positioned away from the area between the slot 210g and the slot 210h.

The antenna apparatus according to the modification of the third embodiment of the present disclosure has been explained above with reference to FIG. 40.

4. Shared Use as Sound Hole

As mentioned earlier, in the embodiment of the present disclosure, the holes provided to the housing are used as a propagation channel for the electric waves. Specifically, these holes may also be used as a propagation channel for the sound output from an internal speaker in the housing to the outside of the housing, or a propagation channel for a sound input to a microphone inside the housing, from the outside of the housing. The speaker or the microphone may be connected to the rear side of the shield, for example.

In a configuration in which the speaker or the microphone is connected to the rear side of the shield, it is preferable to provide one or more holes (hereinafter, also referred to as “sound holes”) to the surface on the rear side of the shield. With such holes provided, the holes may be used as a propagation channel for the sound. Such “shared use as the sound hole” will now be explained, based on the antenna apparatus according to the third embodiment of the present disclosure. However, such shared use as the sound holes is also applicable to the antenna apparatus according to the other embodiments.

Figure 41:
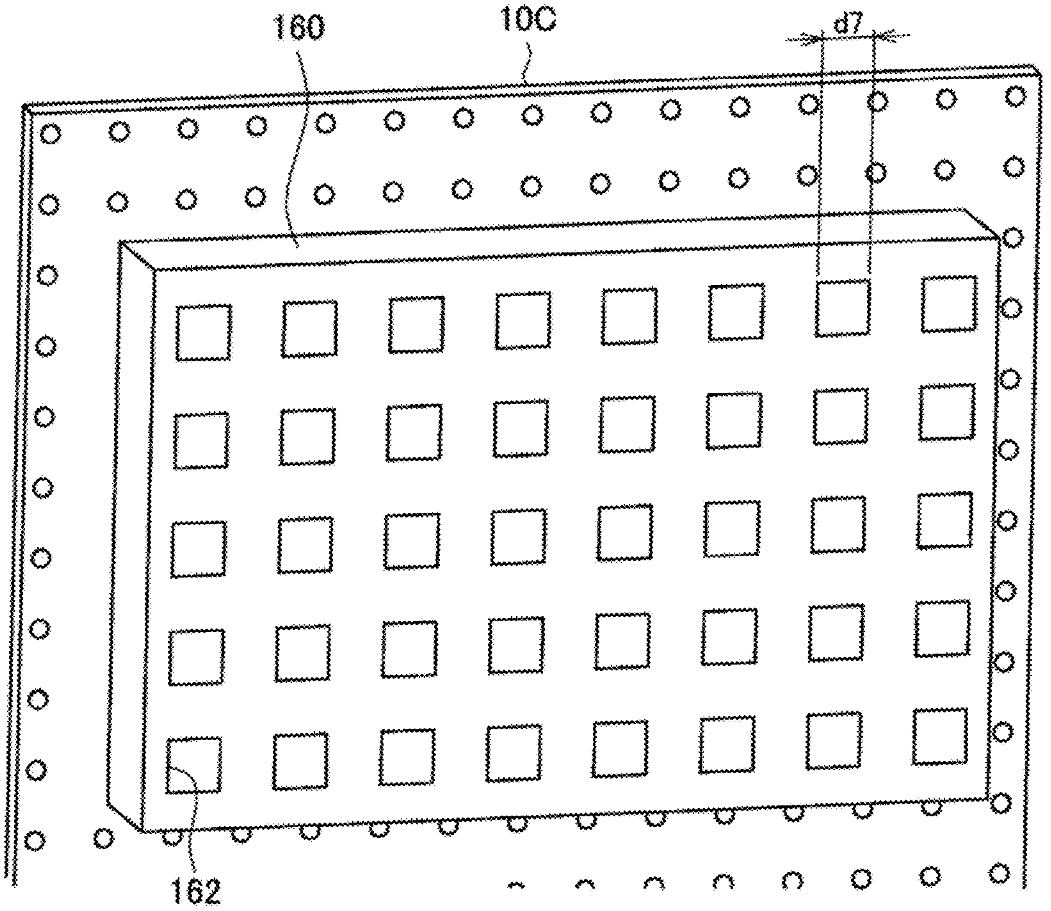
FIG. 41 is an enlarged view of an antenna module having a shield provided with holes, viewed from a diagonally rear side.
Figure 42:
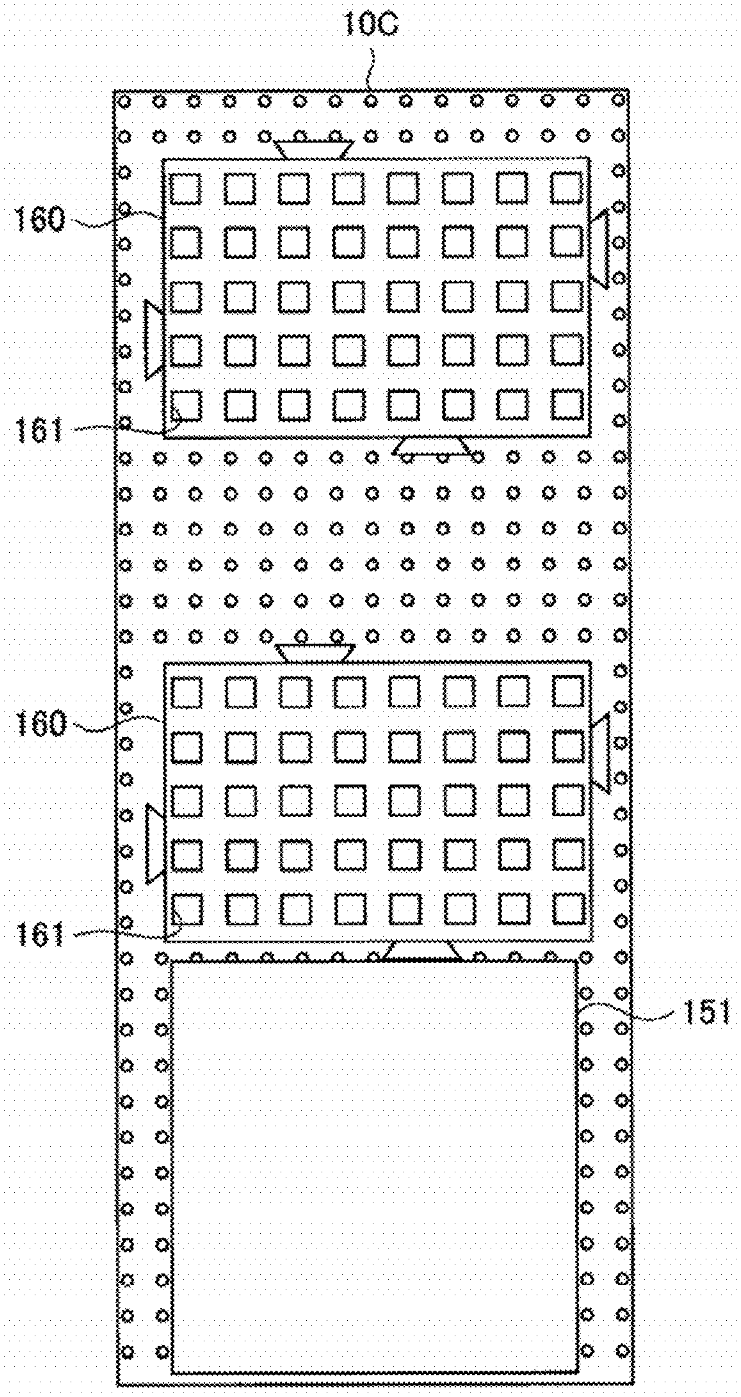
FIG. 42 is a schematic of the antenna module having the shield provided with holes, viewed from the rear side.
Figure 43:
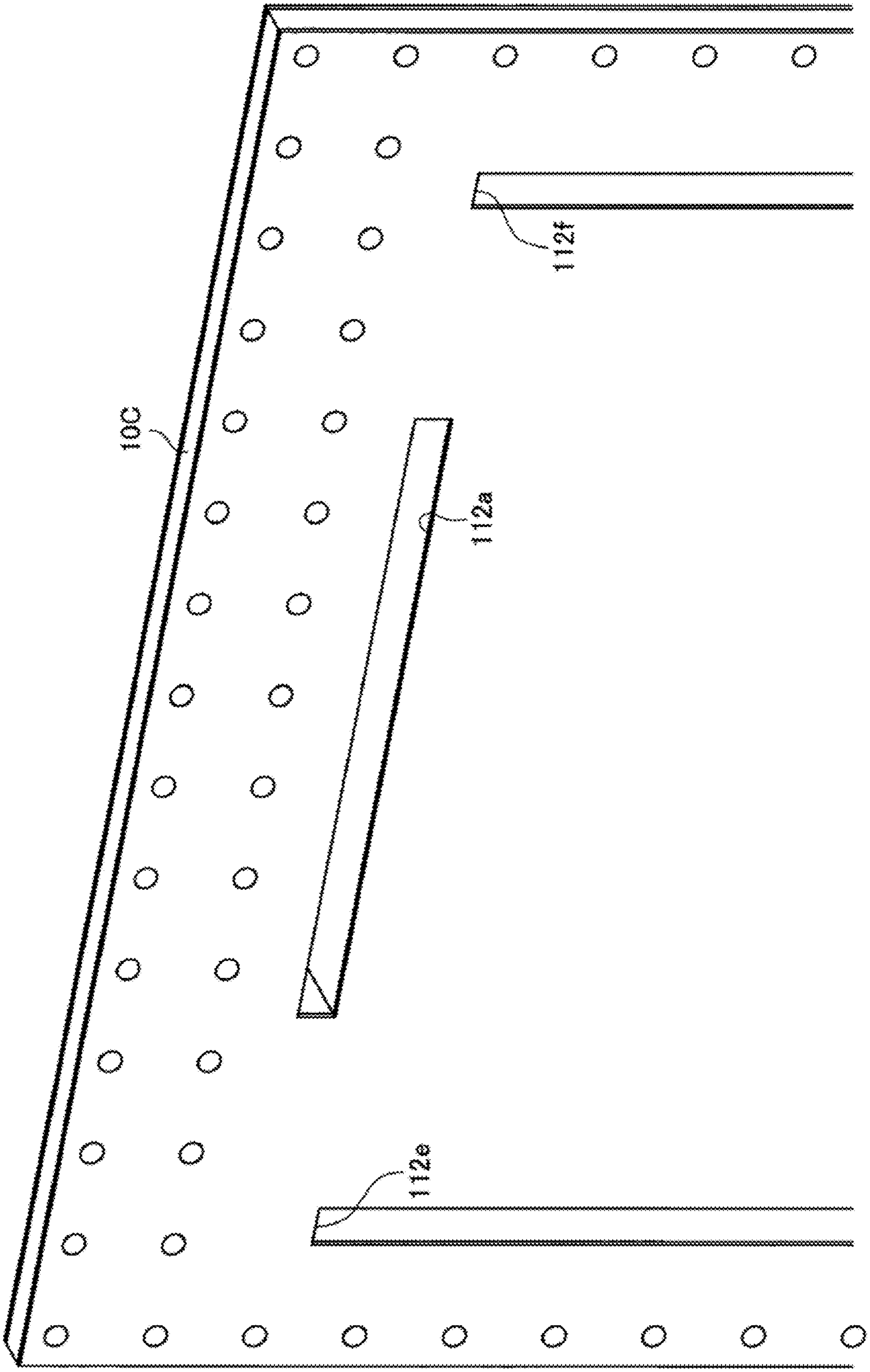
FIG. 43 is an enlarged view of the antenna module having the shield provided with holes, viewed from the diagonally front side.
Figure 44:
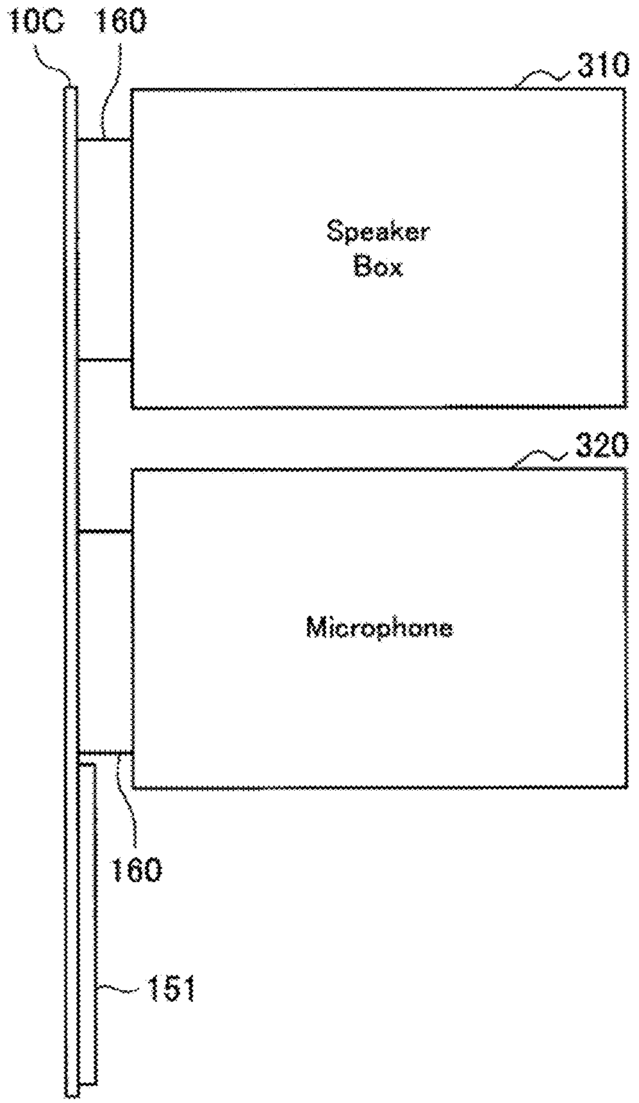
FIG. 44 is a schematic illustrating an example in which a speaker box and a microphone are connected to two respective shields on the surface on the rear side.

FIG. 41 is an enlarged view of the antenna module 10C having the shield 160 provided with holes, viewed from a diagonally rear side. FIG. 42 is a schematic of the antenna module 10C having the shield 160 provided with holes, viewed from the rear side. FIG. 43 is an enlarged view of the antenna module 10C having the shield 160 provided with holes, viewed from the diagonally front side. FIG. 44 is a schematic illustrating an example in which a speaker box 310 and a microphone 320 are provided to the respective surfaces on the rear sides of the two shields 160.

Referring to FIG. 42, a plurality of holes 161 are provided on each of the two shields 160. In the example illustrated in FIG. 42, each of the shields 160 is provided with a matrix of forty holes 161, eight in the horizontal direction by five in the vertical direction. However, the number of holes 161 provided to each of the shields 160 is not limited to any particular number. Furthermore, the positions where the holes 161 are provided on the shield 160 is not particularly limited either.

Furthermore, referring to FIG. 41, the size d7 of the holes 161 in the horizontal direction is indicated. It is preferable for the size d7 of the holes 161 in the horizontal direction to be substantially equal or smaller than ¼ the electric wavelength of the resonance frequency of the antenna (substantially equal to or smaller than a ¼ electric wavelength of the electric wavelength). In the same manner, it is preferable for the size of the holes 161 in the vertical direction, too, to be substantially equal or smaller than ¼ the electric wavelength of the resonance frequency of the antenna (substantially equal to or smaller than a ¼ electric wavelength of the electric wavelength).

When the size of the holes 161 is substantially equal to or smaller than a ¼ electric wavelength, it is possible not to prevent the holes 161 from propagating the sound while suppressing the chances of the holes 161 propagating the electric waves rearwards (while maintaining the shield performance equivalent to the shields not provided with the holes 161). The size of the holes 161 may be changed within the range of the substantially equal to or smaller than a ¼ electric wavelength as appropriate, but the holes 161 with a size of 0.4 mm or so can achieve good shield performance and sound propagation performance, for example.

On the inner layer of the antenna module 10C, the hole 152 are provided in a manner including area facing the holes 161 provided to the shield 160. In this manner, the holes 152 provided to the inner layer of the antenna module 10C can serve as a sound propagation channel.

It is suitable for the size of holes provided to a water repellent sheet provided on the inner side of the housing to be 0.1 to 0.2 mm or so. With the water repellent sheet having the holes with such a size, the sound from the speaker box 310 is better propagated to the outside of the housing (the sound of the microphone 320 is better propagated to the inside of the housing), and the water repellent sheet suppresses the chances of water getting inside of the speaker box 310 and the microphone 320 from the outside of the housing.

In the embodiment of the present disclosure, shared use as the sound holes has been explained above.

5. Application Example

The above description mainly assumes a case in which the antenna apparatus according to the embodiment of the present disclosure is applied to a smartphone. However, it is also possible to apply the antenna apparatus according to the embodiment of the present disclosure to a communication apparatus other than a smartphone. More specifically, the antenna apparatus according to the embodiment of the present disclosure may be applied to any apparatus having a housing at least a part of which is made with a metal and that performs communication using millimeter electric waves. In the explanation hereunder, application examples of the antenna apparatus according to the embodiment of the present disclosure will be explained with reference to FIGS. 45 to 48.

Figure 45:
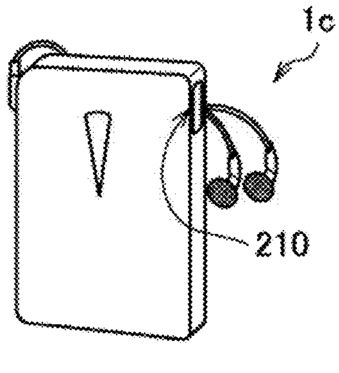
FIG. 45 is a schematic illustrating an example in which the antenna apparatus according to the embodiment of the present disclosure is applied to a music player.
Figure 46:
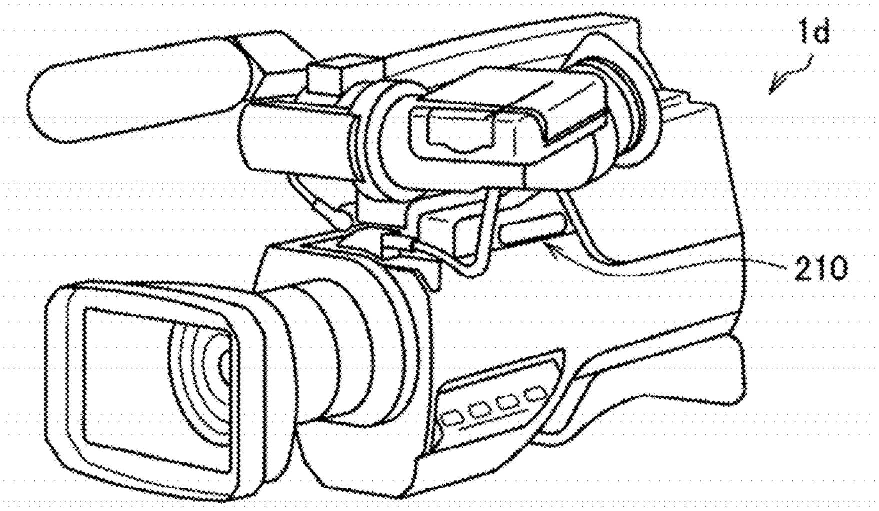
FIG. 46 is a schematic illustrating an example in which the antenna apparatus according to the embodiment of the present disclosure is applied to a camera.
Figure 47:
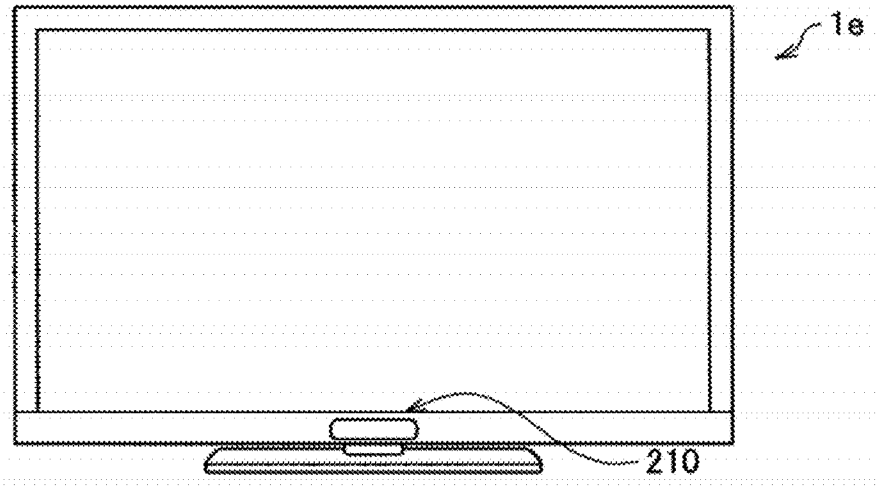
FIG. 47 is a schematic illustrating an example in which the antenna apparatus according to the embodiment of the present disclosure is applied to a television.

FIG. 45 is a schematic illustrating an example in which the antenna apparatus according to the embodiment of the present disclosure is applied to a music player. Referring to FIG. 45, the housing of the music player (communication terminal 1*c*) is illustrated. FIG. 46 is a schematic illustrating an example in which the antenna apparatus according to the embodiment of the present disclosure is applied to a camera. Referring to FIG. 46, the housing of the camera (communication terminal 1*d*) is illustrated. FIG. 47 is a schematic illustrating an example in which the antenna apparatus according to the embodiment of the present disclosure is applied to a television. Referring to FIG. 47, the housing of the television (communication terminal 1*e*) is illustrated.

At least a part of the housing as those illustrated in FIGS. 45 to 47 may be made of metal (for example, the television may have a frame part made of metal). It is also assumed that these apparatuses sometimes perform communication using the millimeter electric waves. At this time, the slots 210 that are the same as those provided to the metal plate in the embodiments described above may be provided to the metal part of the housing, and the antenna module explained in the embodiments above may be housed inside of the housing. In this manner, it is possible to suppress a reduction of antenna gain while maintaining the quality of the design of the housing.

The number of the slots 210 provided to each of these housings may be one, as explained in the first embodiment, or more than one as explained in the second embodiment. The position where the slot is provided on each of these housings is not limited to a particular position. However, when the television is configured to communicate with a terminal, mainly assumed is a situation in which the television communicates with a terminal of a user who is directly facing the television and watching the television. Therefore, it is preferable for the slot to be provided on the front side of the television, and for the television to be capable of establishing communication in a directly frontward direction, using the slot antenna.

Figure 48:
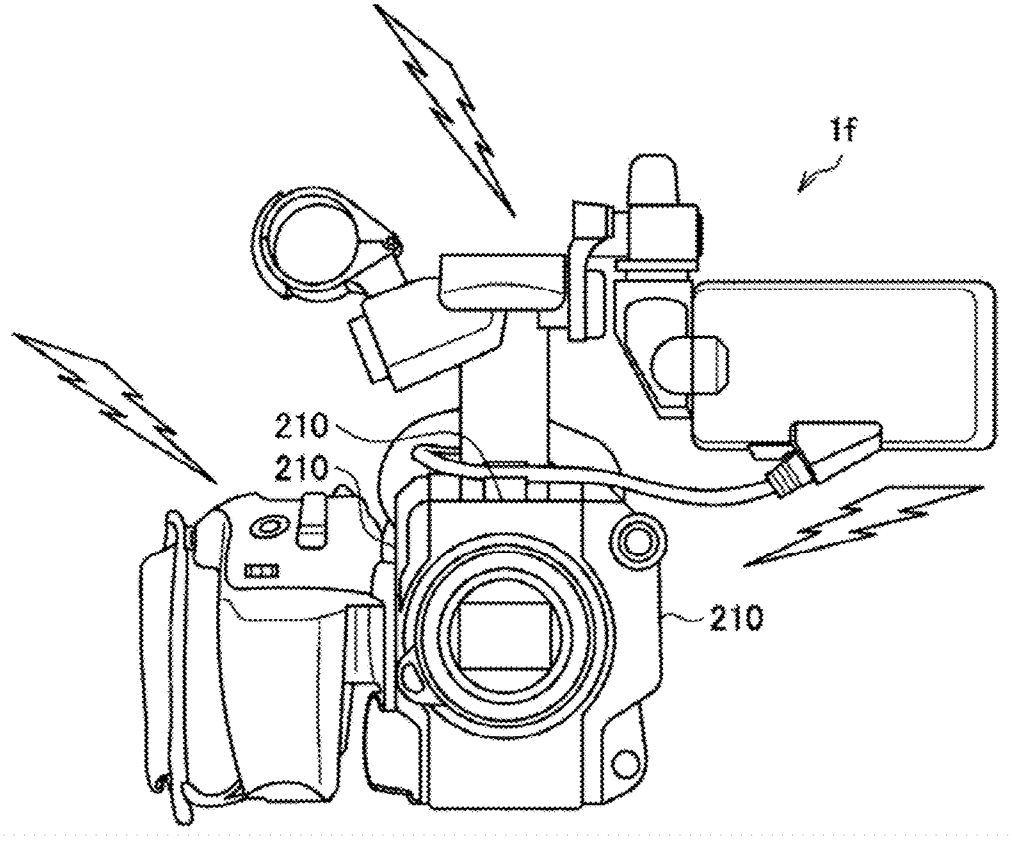
FIG. 48 is a schematic illustrating another example in which the antenna apparatus according to the embodiment of the present disclosure is applied to a camera.

FIG. 48 is a schematic illustrating another example in which the antenna apparatus according to the embodiment of the present disclosure is applied to a camera. Referring to FIG. 48, the housing of the camera (communication terminal 1*f*) is illustrated. When a video captured with the camera is to be uploaded, it is expected for a relay station (indoor access point) to be installed on a wall surface or a ceiling. Therefore, to enable transmissions in an upward, rightward, and leftward directions with respect to the camera (in directions where wall surfaces and the ceiling are present), it is preferable for the slot 210 that is the same as the slot provided to the metal plate in the embodiment described above to be provided at a plurality of positions of a housing if (e.g., on the top, the left, and the right surfaces, as illustrated in FIG. 48).

Some application examples of the antenna apparatus according to the embodiment of the present disclosure have been explained above with reference to FIGS. 45 to 48.

6. Conclusion

As explained above, the antenna apparatus according to the embodiment provides an antenna apparatus including: an antenna module that includes a first slot antenna that transmits or receives a first wireless signal, a first feed element that supplies power to the first slot antenna, a second slot antenna that transmits or receives a second wireless signal having a polarization direction orthogonal to a polarization direction of the first wireless signal, and a second feed element that supplies power to the second slot antenna; and a metal plate including a first slot, and a second slot that has its longitudinal direction orthogonal to a longitudinal direction of the first slot.

With the structure described above, using the antenna apparatus according to the embodiment, a reduction of antenna gain can be suppressed while maintaining the quality of the design of the exterior furnishing of the antenna.

Some preferred embodiments of the present disclosure have been explained in detail with reference to the appended drawings, but the technical scope of the present disclosure is not limited thereto. It is clear that those who have ordinary knowledge in the technical field of the present disclosure can arrive at various changed or modified examples within the scope of the technical idea described in the appended claims, and naturally, those examples also fall within the technical scope of the present disclosure.

The advantageous effects described herein are also merely explanatory or exemplary, are not limiting. In other words, the technology according to the present disclosure can achieve other advantageous effects that are clear for those skilled in the art based on the descriptions herein, in addition to or instead of the advantageous effects described above.

Configurations such as those described below also fall within the technical scope of the present disclosure.

(1)

An antenna apparatus comprising:
- an antenna module that includes
  - a first slot antenna that transmits or receives a first wireless signal,
  - a first feed element that supplies power to the first slot antenna,
  - a second slot antenna that transmits or receives a second wireless signal having a polarization direction orthogonal to a polarization direction of the first wireless signal, and
  - a second feed element that supplies power to the second slot antenna; and
- a metal plate that includes
  - a first slot, and
  - a second slot a longitudinal direction of which is orthogonal to a longitudinal direction of the first slot.

(2)

The antenna apparatus according to (1), wherein a shield is mounted on the antenna module.

(3)

The antenna apparatus according to (2), wherein the shield is provided with one or more holes.

(4)

The antenna apparatus according to (3), wherein a speaker or a microphone is connected to the shield.

(5)

The antenna apparatus according to (3) or (4), wherein the shield is mounted on a second substrate positioned on a side opposite to a first substrate, the first substrate being provided with slots corresponding to the first slot antenna and the second slot antenna, respectively, in the antenna module.

(6)

The antenna apparatus according to (5), wherein the second substrate is provided with a hole that covers an area facing the holes provided to the shield.

(7)

The antenna apparatus according to (5) or (6), wherein the antenna module includes a third substrate having a dielectric between the first substrate and the second substrate, and a size of the holes in a polarization direction of the first wireless signal is substantially ¼ a wavelength of the first wireless signal, and a size of the holes in a polarization direction of the second wireless signal is substantially ¼ a wavelength of the second wireless signal.

(8)

The antenna apparatus according to any one of (1) to (7), wherein the first slot is positioned between two of the second slots.

(9)

The antenna apparatus according to any one of (1) to (8), wherein a size of a slot corresponding to the first slot antenna in a longitudinal direction is substantially ½ a wavelength of the first wireless signal, and a size of a slot corresponding to the second slot antenna in a longitudinal direction is substantially ½ a wavelength of the second wireless signal.

(10)

The antenna apparatus according to any one of (1) to (9), wherein a short-side direction of the first slot substantially matches a polarization direction of the first wireless signal, and a short-side direction of the second slot substantially matches a polarization direction of the second wireless signal.

(11)

The antenna apparatus according to any one of (1) to (10), wherein the metal plate makes up at least a part of a predetermined housing that houses the antenna module.

(12)

The antenna apparatus according to any one of (1) to (11), wherein an interval between a plurality of the first slots is substantially ½ a wavelength of the first wireless signal, and an interval between a plurality of the second slots is substantially ½ a wavelength of the second wireless signal.

REFERENCE SIGNS LIST

1 communication terminal
10 the antenna module
110 front-side layer
112 slot
114 via
130 inner layer
131 feed point
133 strip line
132 inner layer line
134 via

135 dielectric
150 rear-side layer
151 RFIC
152 hole
154 via
160 shield
161 hole
20 housing (metal plate)
210 slot
211 hole
212 hole
310 speaker box
320 microphone

The invention claimed is:

1. An antenna apparatus comprising:
an antenna module that includes
a first slot antenna that transmits or receives a first wireless signal,
a first feed element that supplies power to the first slot antenna,
a second slot antenna that transmits or receives a second wireless signal having a polarization direction orthogonal to a polarization direction of the first wireless signal, and
a second feed element that supplies power to the second slot antenna; and
a metal plate that includes
a first slot, and
a second slot a longitudinal direction of which is orthogonal to a longitudinal direction of the first slot, wherein
a shield is mounted on the antenna module, and
a speaker or a microphone is connected to the shield.

2. The antenna apparatus according to claim 1, wherein the shield is provided with one or more holes.

3. The antenna apparatus according to claim 1, further comprising:
a third slot a longitudinal direction of which is orthogonal to a longitudinal direction of the first slot.

4. The antenna apparatus according to claim 3, wherein the first slot is positioned between the second slot and the third slot.

5. The antenna apparatus according to claim 1, wherein
a size of a slot corresponding to the first slot antenna in a longitudinal direction is substantially ½ a wavelength of the first wireless signal, and a size of a slot corresponding to the second slot antenna in a longitudinal direction is substantially ½ a wavelength of the second wireless signal.

6. The antenna apparatus according to claim 1, wherein
a short-side direction of the first slot substantially matches a polarization direction of the first wireless signal, and
a short-side direction of the second slot substantially matches a polarization direction of the second wireless signal.

7. The antenna apparatus according to claim 1, wherein
the metal plate makes up at least a part of a predetermined housing that houses the antenna module.

8. An antenna apparatus comprising:
an antenna module that includes
a first slot antenna that transmits or receives a first wireless signal,
a first feed element that supplies power to the first slot antenna,
a second slot antenna that transmits or receives a second wireless signal having a polarization direction orthogonal to a polarization direction of the first wireless signal, and
a second feed element that supplies power to the second slot antenna; and
a metal plate that includes
a first slot, and
a second slot a longitudinal direction of which is orthogonal to a longitudinal direction of the first slot, wherein
a shield is mounted on the antenna module, and
the shield is mounted on a second substrate positioned on a side opposite to a first substrate, the first substrate being provided with slots corresponding to the first slot antenna and the second slot antenna, respectively, in the antenna module.

9. The antenna apparatus according to claim 8, wherein
the shield is provided with one or more holes, and
the second substrate is provided with a hole that covers an area facing the holes provided to the shield.

10. The antenna apparatus according to claim 8, wherein
the shield is provided with one or more holes,
the antenna module includes a third substrate having a dielectric between the first substrate and the second substrate, and
a size of the holes in a polarization direction of the first wireless signal is substantially ¼ a wavelength of the first wireless signal, and a size of the holes in a polarization direction of the second wireless signal is substantially ¼ a wavelength of the second wireless signal.

11. An antenna apparatus comprising:
an antenna module that includes
a first slot antenna that transmits or receives a first wireless signal,
a first feed element that supplies power to the first slot antenna,
a second slot antenna that transmits or receives a second wireless signal having a polarization direction orthogonal to a polarization direction of the first wireless signal, and
a second feed element that supplies power to the second slot antenna;
a shield mounted on the antenna module; and
a speaker or a microphone connected to the shield.

12. The antenna apparatus of claim 11, wherein
the shield is provided with one or more holes.

13. The antenna apparatus of claim 11, wherein
the shield is mounted on a second substrate positioned on a side opposite to a first substrate, the first substrate being provided with slots corresponding to the first slot antenna and the second slot antenna, respectively, in the antenna module.

14. The antenna apparatus of claim 13, wherein
the shield is provided with one or more holes, and
the second substrate is provided with a hole that covers an area facing the holes provided to the shield.

15. The antenna apparatus of claim 13, wherein
the antenna module includes a third substrate having a dielectric between the first substrate and the second substrate.

* * * * *